United States Patent
Ide et al.

(10) Patent No.: US 6,470,148 B2
(45) Date of Patent: Oct. 22, 2002

(54) DISTANCE MEASURING DEVICE

(75) Inventors: Masataka Ide, Hachioji; Hisayuki Matsumoto, Hino; Takeshi Kindaichi, Hachioji; Koichi Nakata, Kokubunji, all of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/775,983

(22) Filed: Feb. 2, 2001

(65) Prior Publication Data

US 2001/0014215 A1 Aug. 16, 2001

(30) Foreign Application Priority Data

Feb. 9, 2000 (JP) ........................................ 2000-032153

(51) Int. Cl.$^7$ .............................................. G03B 13/36
(52) U.S. Cl. ........................... 396/80; 396/96; 396/106; 396/123; 396/92
(58) Field of Search ............................... 396/80–82, 98, 396/99, 106, 121–123, 124, 96, 92

(56) References Cited

U.S. PATENT DOCUMENTS 6,308,014 B1 * 10/2001 Nonaka et al. ............. 396/106

FOREIGN PATENT DOCUMENTS

| JP | 10-104502 | 4/1998 |
| JP | 10-126679 | 5/1998 |

* cited by examiner

*Primary Examiner*—W. B. Perkey
(74) *Attorney, Agent, or Firm*—Straub & Pokotylo; John C. Pokotylo

(57) ABSTRACT

This invention is an inexpensive distance measuring device having short lag time, configured so as to have a pair of light receiving regions at positions of focal points of a pair of image forming optical systems, comprising functions for dividing the light receiving regions and for monitoring the integration control for each divided light receiving region, also comprising an AF area sensor capable of performing pre-integration operations while causing strobe light to be emitted, and a microcomputer that, according to object field luminance distributions obtained from pre-integration results of the AF area sensor and to the focal length value of the photographic lens, divides the light receiving regions of the AF area sensor into respective pluralities, causes final integration operations to be performed while monitoring the integration control in each of the divided light receiving regions, and performs ranging computations based on data obtained for each light receiving region, capable of performing appropriate integration control over the entirety of a wide-range ranging region.

19 Claims, 22 Drawing Sheets

FIG.11A
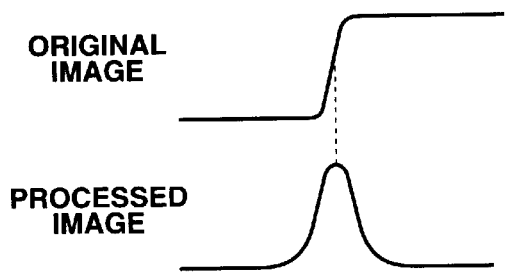
ORIGINAL IMAGE
PROCESSED IMAGE
FIG.11B
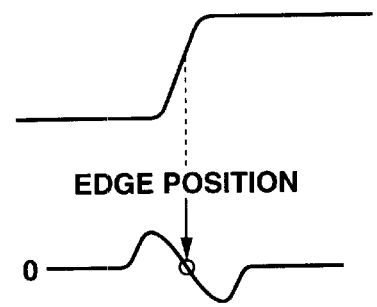
EDGE POSITION
FIG.12A
| -1 | 0 | 1 |
|----|---|---|
| -1 | 0 | 1 |
| -1 | 0 | 1 |
FIG.12B
| 1  | 1  | 1  |
|----|----|----|
| 0  | 0  | 0  |
| -1 | -1 | -1 |
FIG.12C
| 0  | -1 | 0  |
|----|----|----|
| -1 | 4  | -1 |
| 0  | -1 | 0  |
FIG.12D
| -1 | 0 | 1 |
|----|---|---|
| -2 | 0 | 2 |
| -1 | 0 | 1 |
+
| -1 | -2 | -1 |
|----|----|----|
| 0  | 0  | 0  |
| 1  | 2  | 1  |

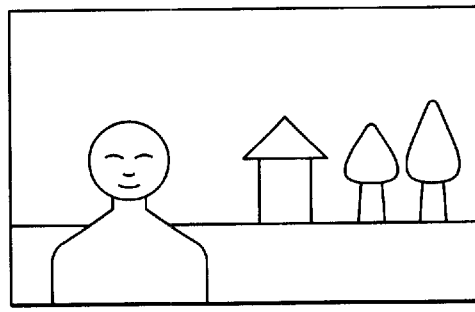
FIG.17A ORIGINAL IMAGE — IMAGE PICK-UP REGION 12a FOR AF SENSOR 12 CORRESPONDING TO IMAGE PICK-UP SCREEN
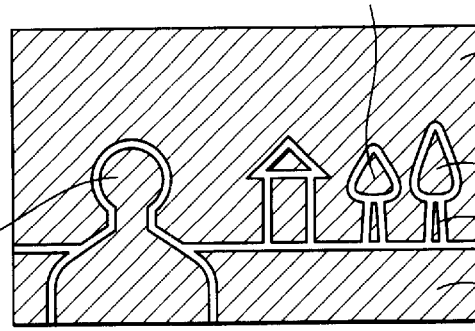
FIG.17B AFTER BINARIZATION PROCESSING — LABELING 6, LABELING 1, LABELING 2, LABELING 4, LABELING 5, LABELING 3
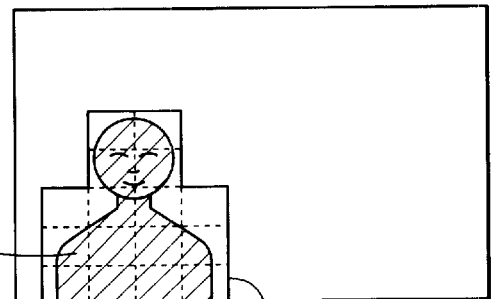
FIG.17C — 41: PERSON DETERMINATION REGION, 42: DIVIDED AREA
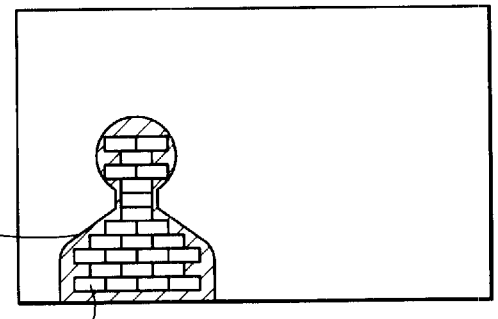
FIG.17D — 41: PERSON DETERMINATION REGION, 43: RANGING AREA GROUP

PHOTOGRAPHIC SCENE

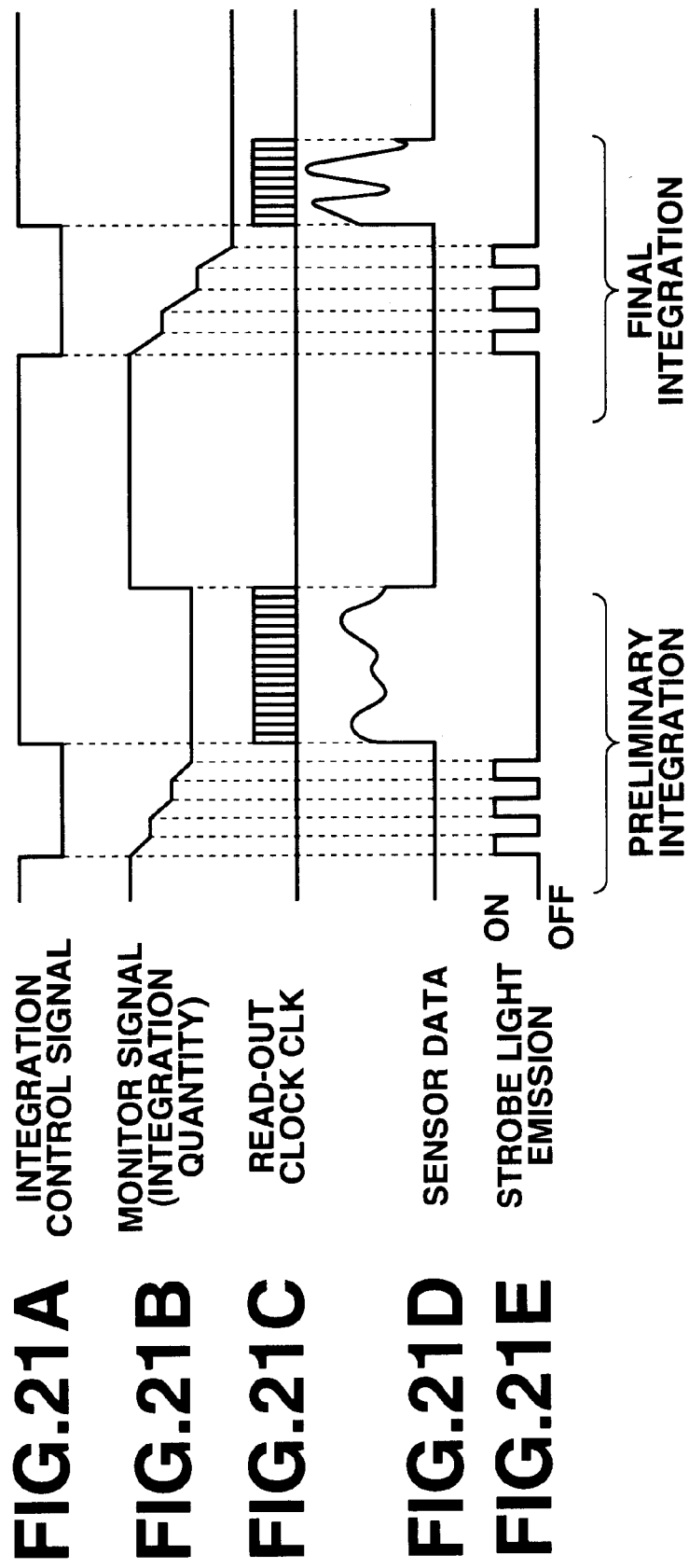

50: REGION CORRESPONDING TO IMAGE PICK-UP SCREEN AT WIDE-ANGLE SETTING
51: DIVIDED AREA AT WIDE-ANGLE SETTING
52: REGION CORRESPONDING TO IMAGE PICK-UP SCREEN AT TELEPHOTO SETTING
53: DIVIDED AREA AT TELEPHOTO SETTING

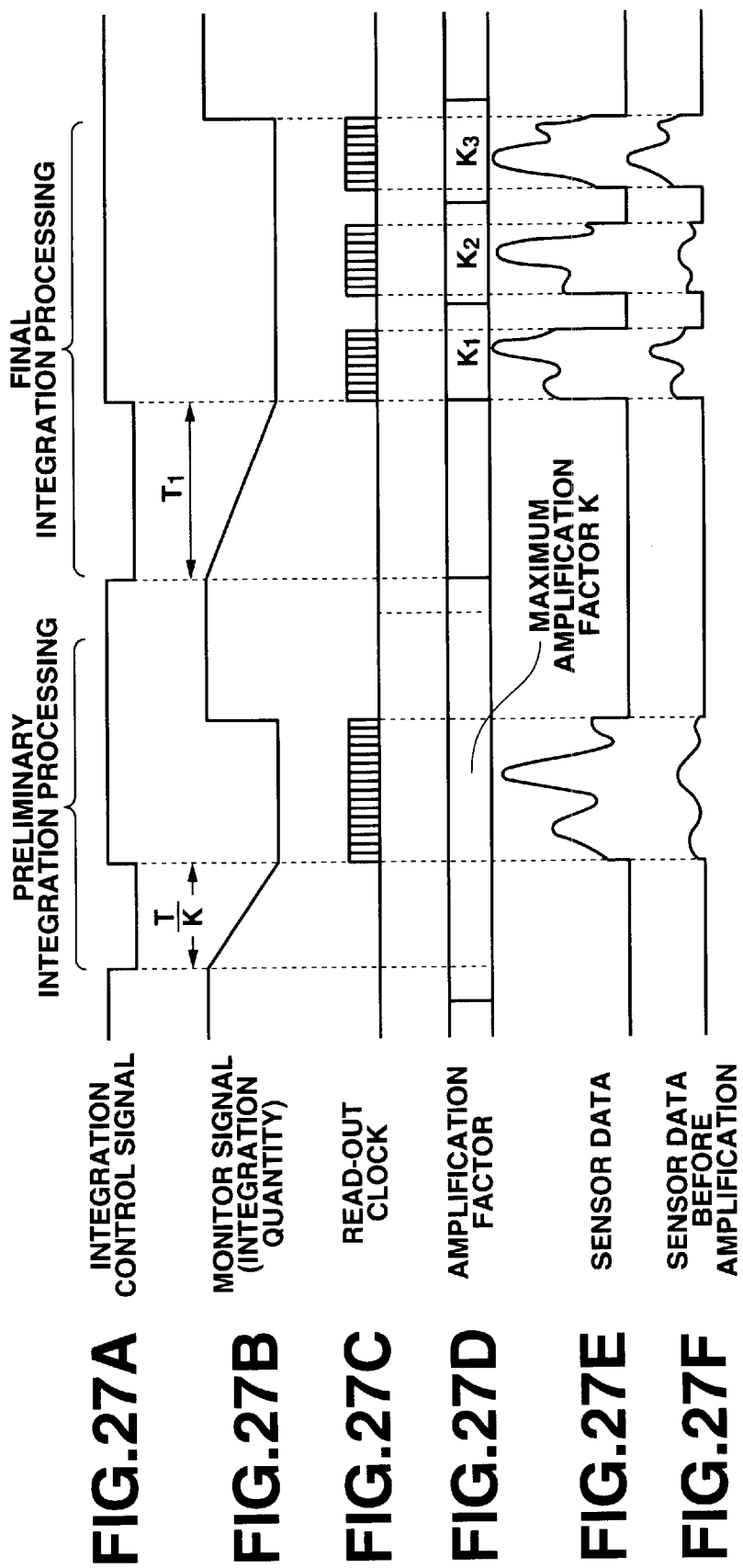

DISTANCE MEASURING DEVICE

This application claims benefit of Japanese Application No. 2000-032153 filed in Japan on Feb. 9, 2000, the contents of which are incorporated by this reference.

BACKGROUND OF THE INVENTION

1. Field of the Invention

This invention relates to a distance measuring device, and more particularly to a distance measuring device having area sensing means deployed at the focal point position(s) of a pair of image formation optical systems.

2. Description of the Related Art

More and more cameras are being provided with autofocus functions in recent years, being configured so that the distance to the object is detected by a distance measuring device, and the photographic lens is moved to a focus position based on the results of that detection.

When measuring the distance to an object by such a distance measuring device, in addition to distance measuring devices wherewith ranging is made only in a limited region in the center of the screen, distance measuring devices have come to be known in recent years which have a wider field of view.

In Japanese Patent Application Laid-Open No. H10-104502/1998 (published), for example, a type of such a distance measuring device having a wide-range field of view is described which divides the image pick-up region of a two-dimensional area sensor into a plurality of areas, and performs integration control based on a maximum accumulation quantity pixel signal for each divided area.

And in Japanese Patent Application Laid-Open No. H10-126679/1988 (published) is described a distance measuring device that deploys a monitor sensor so as to enclose the periphery of a two-dimensional area sensor, and performs integration control on the area sensor overall based on outputs from that monitor sensor.

The distance measuring device described in Japanese Patent Application Laid-Open No. H10-104502/1988 (published), however, is object to the following problems.

That is, means are employed for referencing a maximum value inside the area of each divided area, sequentially, divided area by divided area, stopping the integration when an appropriate integral quantity has been arrived at in each divided area. Wherefore, when the object is a high-brightness object, saturation can occur before the integration control can be effected.

In order to cope with this problem, a high-speed control circuit or area sensor circuit may be employed. In that case, however, costs are increased, wherefore such application ceases to be suitable for a small size instrument such as a compact camera, for example.

Furthermore, because the method of dividing the area is fixed, in cases where one object covers a plurality of division areas, a problem arises in that the integration quantity differs from one portion of that same object to another, whereupon image data are produced which are not suitable to the detection of the primary object.

With the art described in Japanese Patent Application Laid-Open No. H10-126679/1988 (published), on the other hand, the positions of the two-dimensional area sensor and monitor sensor differ, wherefore, when the two-dimensional area sensor and monitor sensor sense different object images, even if appropriate control is effected according to the output of the monitor sensor, problems arise, such as the area sensor integral quantity being too great so that saturation is reached, or, conversely, such as the integration being insufficient, so that appropriate object image data cannot be obtained.

Also, in cases where the accumulation quantity reaches saturation or is insufficient, integration will be performed repeatedly, wherefore the time lag will increase, which is also a problem.

SUMMARY OF THE INVENTION

An object of the present invention is to provide an inexpensive distance measuring device with which appropriate integration control can be effected across the entirety of a wide-range ranging region, and wherewith the time lag is short.

The present invention, substantially, is a distance measuring device comprising: two optical systems exhibiting parallax; an image pick-up element for photographically capturing two images formed by the abovementioned optical systems; region setting means for setting divided regions based on output from the abovementioned image pick-up element; integration control means for controlling integration operations of the abovementioned image pick-up element according to divided regions produced by the abovementioned region division means; and distance measurement means for performing distance measurements based on output from the abovementioned image pick-up element.

The present invention, moreover, is a distance measuring device comprising: an area sensor deployed in the vicinity of position of focal points of a pair of image forming optical systems, and having a pair of light receiving regions; a region dividing unit for dividing each of light receiving regions of the abovementioned area sensor means into a plurality of regions according to area sensor data obtained from results of preliminary integrations of the abovementioned area sensor means; and a control circuit for causing the abovementioned area sensor to perform final integration operations for each of the abovementioned set plurality of light receiving regions, and for computing signals for putting a photographic lens into a focused condition based on data obtained for each of the abovementioned plurality of light receiving regions.

The present invention, furthermore, is a distance measuring device comprising: an area sensor deployed in the vicinity of focal points of a pair of image forming optical systems, and having a pair of light receiving regions; main photographic object detection means for detecting region where main photographic object is present; region division means for setting light receiving regions of the abovementioned area sensor based on output of the abovementioned main photographic object detection means; and control means for causing the abovementioned area sensor means to perform final integration operations for each of the abovementioned set light receiving regions, and performing distance measurement computations based on data obtained for each of those light receiving regions.

Still further, the present invention is a control method for a camera that puts a photographic lens into a focused condition for a main photographic object in an image pick-up screen, comprising the steps of: detecting image signals in the abovementioned image pick-up screen; detecting the abovementioned main photographic object based on the abovementioned image signals; setting a virtual area inside the abovementioned image pick-up screen so as to contain the abovementioned detected main photographic object; again detecting image signals in the abovementioned virtual area; computing signals for putting the abovementioned photographic lens into a focused condition based on the abovementioned re-detected image signals; and putting the abovementioned photographic lens in a focused condition based on results of the abovementioned computation.

These object(s) and advantages of the present invention will become further apparent from the following detailed explanation.

BRIEF DESCRIPTION OF THE DRAWINGS

FIGS. 11A and 11B are line images representing image processing using a first differential operator and a second differential operator in the first embodiment aspect;

FIGS. 12A, 12B, 12C, and 12D are diagrams representing examples of space filter tables in the first embodiment aspect;

FIGS. 17A, 17B, 17C, and 17D are diagrams representing the appearance of image data processed when a person is determined by shape determination processing, in the first embodiment aspect;

FIGS. 21A, 21B, 21C, 21D, and 21E are timing charts representing the behavior of signals when preliminary integration and final integration are performed, in the second embodiment aspect;

FIGS. 27A, 27B, 27C, 27D, 27E, and 27F are timing charts representing the behavior of signals when preliminary integration and final integration are performed, in the fourth embodiment aspect.

DESCRIPTION OF THE PREFERRED EMBODIMENTS

Embodiment aspects of the present invention are described below, with reference to the drawings.

Figure 1:
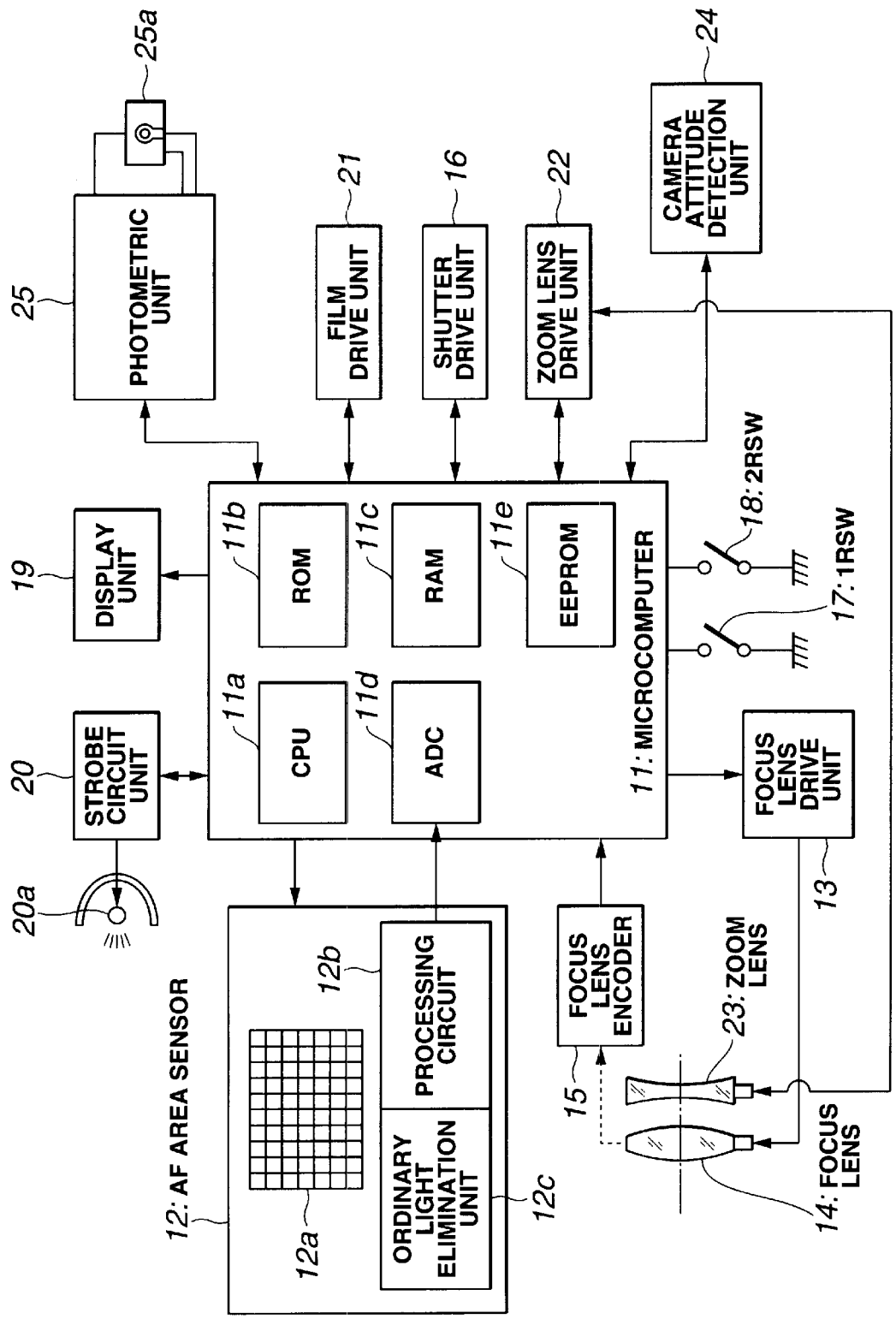
FIG. 1 is a block diagram representing the configuration of a camera in a first embodiment aspect of the present invention.

FIG. 1 to FIG. 17D represent a first embodiment aspect of the present invention. FIG. 1 is a block diagram representing the configuration of a camera.

This camera comprises control means, ranging means, and a microcomputer 11 that is a system controller which also functions as preliminary detection means. The microcomputer 11 is configured so that it has a CPU (central processing unit) 11a that performs a series of operations according to a sequence program, a ROM 11b for storing the sequence program, a RAM 11c that provides working memory for the CPU 11a, an A/D converter lid, and an EEPROM 11e for storing compensation data for each camera relating to AF, photometry, and exposure computations, etc., and for storing various kinds of parameters and the like for detecting a primary object in an image pick-up screen to be described subsequently.

An AF area sensor 12 that is an image pick-up element constituting area sensor means picks up an object image formed by a ranging optical system (cf. FIGS. 3A and 3B), described subsequently, and converts that image to electrical signals. This AF area sensor 12 is configured such that it has an image pick-up region (light receiving region) 12a formed by light receiving elements consisting of photodiodes or the like arrayed two-dimensionally in the horizontal dimension and vertical dimension, a processing circuit 12b that is a circuit for processing the electrical signals output from the image pick-up region 12a and that constitutes region division means for performing processing to divide a light receiving region such as is described subsequently into a plurality, and an ordinary light elimination unit 12c constituting ordinary light elimination means for detecting image pick-up signals corresponding only to light reflected from the object, when performing image pick-up while projecting auxiliary light, by that projected light component, from those image pick-up signals.

Provision is made so that the output from this AF area sensor 12, after being converted to digital signals by the A/D converter 11d in the microcomputer 11, is processed inside that microcomputer 11.

The operations of such an AF area sensor 12 are as follows.

When light is input to the light receiving elements in the image pick-up region 12a described above, electrical charges are generated by optoelectric transfer. These charges are converted to voltages by pixel circuits for each pixel, and output after being amplified.

The microcomputer 11 described earlier controls the integration operations of the AF area sensor 12 and the sensor data read-out operations thereof, and also objects the sensor data output from that AF area sensor 12 to processing in performing ranging computations.

When photographing is performed while projecting auxiliary light, provision is made so that switching can be done so as to eliminate or not eliminate ordinary light by the microcomputer 11. When the ordinary light is to be eliminated, image pick-up signals corresponding only to light reflected from the object resulting from the projected light component are detected.

A focus lens drive unit 13 drives a focus lens 14 contained in the photographic lens so as to focus it, and is configured so as to comprise a focusing motor and control circuit therefor, etc.

Provision is made so that the position of the focus lens 14 is detected by a focus lens encoder 15 constituting focal length detection means, and output as a pulse signal corresponding to the amount of movement in the focus lens 14.

That is, the microcomputer 11 is configured so that it outputs drive signals to the focus lens drive unit 13 based on the results of ranging computations, monitors the output of the focus lens encoder 15, and controls the position of the focus lens 14 by the focus lens drive unit 13.

A photometric unit 25 is configured so that it measures the light after dividing a range corresponding to the image pick-up screen into a plurality, processes photoelectric current signals generated from the divided regions of a light receiving element for photometry 25a, and generates photometric outputs.

The photometric output from that photometric unit 25 is also input to the microcomputer 11, A/D converted by the A/D converter 11d, and then used in the photometry and exposure computations in the microcomputer 11.

A shutter drive unit 16 controls the drive of a shutter (not shown) based on commands output from the microcomputer 11, and controls the time intervals with which the object light flux transmitted through the photographic lens reaches the film.

A strobe circuit unit 20 controls the light emissions of a strobe 20a that functions as auxiliary light projection means used during photographing, and is configured so that, by commands from the microcomputer 11, the electrical charging of and light emissions therefrom are controlled by the strobe circuit unit 20. This strobe circuit unit 20 is also used for AF auxiliary light during ranging operations.

A display unit 19 displays various kinds of information relating to this camera by LCDs or other display elements, under the control of the microcomputer 11.

A zoom lens drive unit 22 is configured so that, according to commands from the microcomputer 11, it drives a zoom lens 23 of the photographic lens and makes changes in the focal length. Provision is made so that that focal length information corresponding to the position of the zoom lens 23, the focal length of which has been changed in this manner, is output to the microcomputer 11.

A camera attitude detection unit 24 detects the camera attitude (that is, whether it is positioned vertically or horizontally, for example), and outputs that information to the microcomputer 11.

A film drive unit 21, based on commands from the microcomputer 11, performs film drive operations such as auto-loading operations when loading film, single-frame winding advance operations after an exposure, and rewind operations after the completion of a series of photographings.

A first release switch 17 and a second release switch 18 constitute a two-stage switch that is linked to depression actions with a release button, configured so that the first release switch 17 turns on when the release button is depressed to a first stage and so that the second release switch 18 turns on when the release button is depressed further to a second stage.

The microcomputer 11 is configured so that, upon detecting that the first release switch 17 has turned on, it performs an AF operation or ranging operation, and upon detecting that the second release switch 18 has turned on, it causes an exposure operation to be performed by the shutter drive unit 16, and also so that it causes the film drive unit 21 to perform a film winding advance operation after that exposure operation has been completed.

Figure 2:
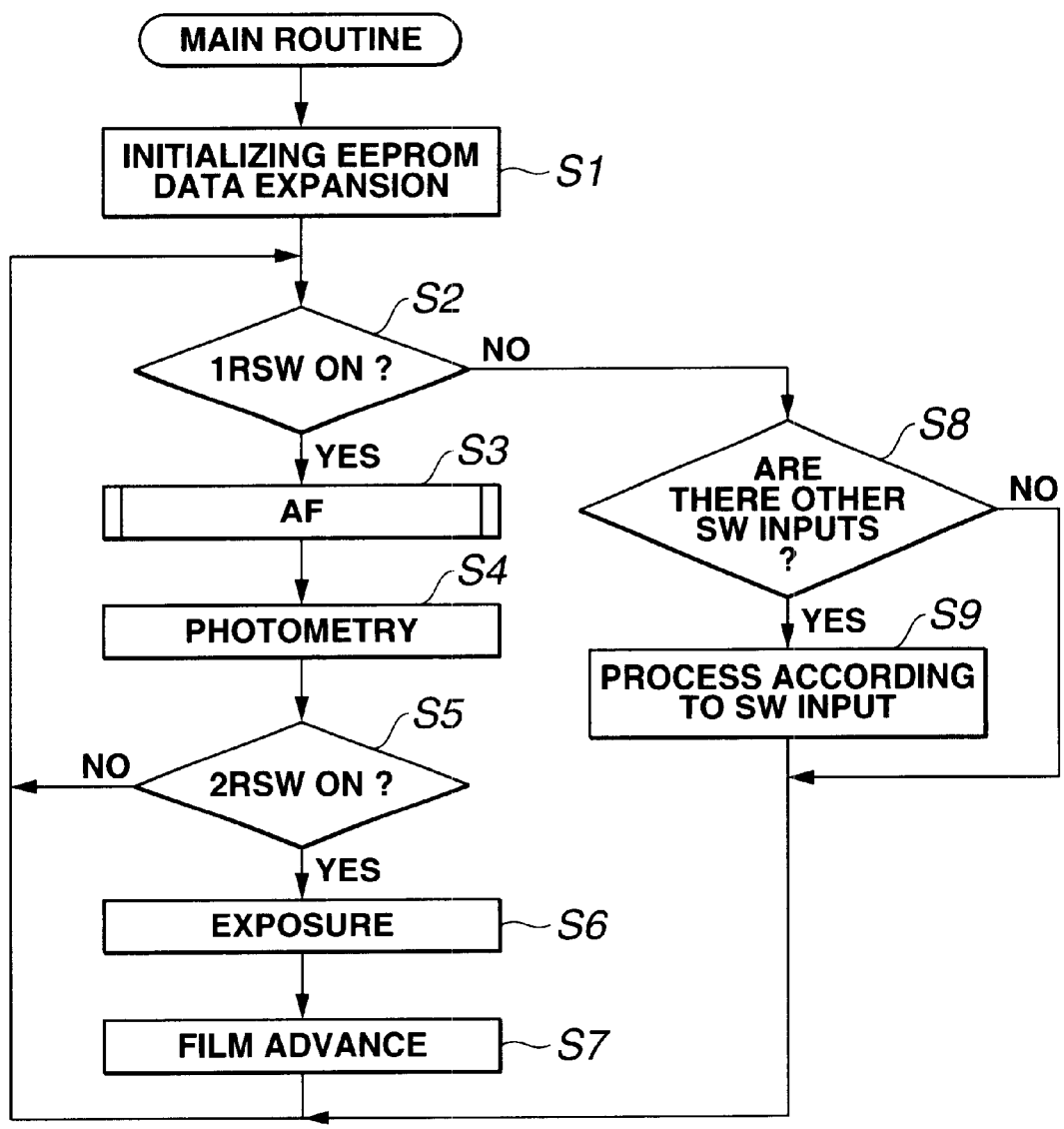
FIG. 2 is a flowchart of the main routines performed by a microcomputer in the first embodiment aspect.

Next, FIG. 2 is a flowchart that represents the main routine executed by the microcomputer 11.

When a battery is mounted in the camera, or when an electric power switch (not shown) is turned on after the battery has been mounted, the microcomputer 11 begins operating and executes a sequence program stored in the ROM 11b.

When these operations are started, first, each block inside the camera is initialized, and compensation data and adjustment data for AF and photometry and the like stored in the EEPROM 11e are read into the RAM 11c (step S1).

Then the condition of the first release switch 17 is detected (step S2).

Here, if the first release switch 17 is on, then ranging is performed based on sensor data from the AF area sensor 12 and, based on the results of that ranging, an AF operation is performed that drives the focus lens 14 by the focus lens drive unit 13 while referencing the output from the focus lens encoder 15 (step S3).

After that, ranging and exposure computations are made based on the output from the ranging unit 25 (step S4).

Then the microcomputer 11 waits until the second release switch 18 turns on (step S5). When the second release switch 18 is still in the off state here, step S2 is returned to and the operations described above are repeated.

When the second release switch 18 is turned on, on the other hand, a shutter operation is performed by the shutter drive unit 16 and an exposure is made on the film (step S6).

When the exposure operation is completed, the film is wound ahead one frame by the film drive unit 21 (step S7), and step S2 is returned to in preparation for the next photograph to be taken.

In step S2, described above, when the first release switch 17 is still off, inputs from switches other than the first release switch 17 and second release switch 18 are detected (step S8). If no such inputs are detected, the step S2 is returned to, and the status of the first release switch 17 is detected. If, on the other hand, such an input is detected, processing is performed according to that switch input. If the switch is the zoom-in switch, for example, then the zoom lens 23 is objected to a zoom up or zoom down action by the zoom lens drive unit 22 according to whether that zoom switch input is up or down (step S9). Then step S2 is returned to and the microcomputer 11 waits for the first release switch 17 to turn on.

Figure 3A:
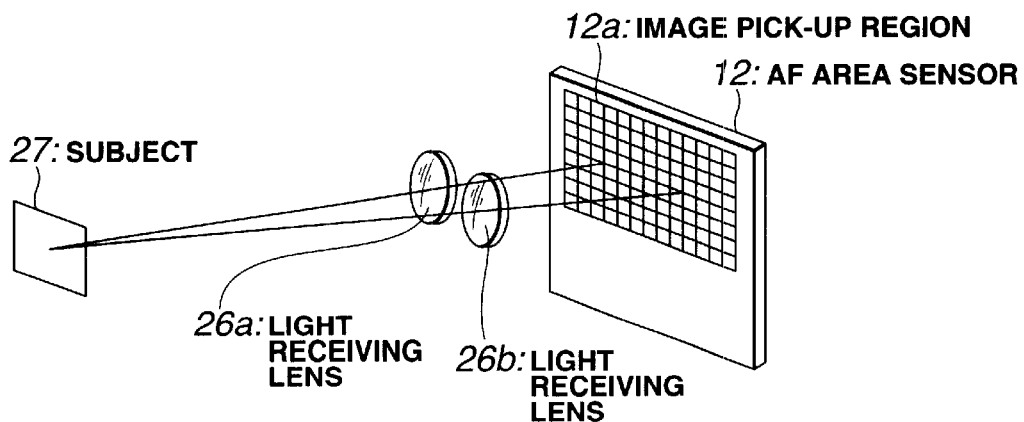
FIGS. 3A and 3B are a perspective view and plan view showing the deployment of a ranging optical system and AF area sensor in the first embodiment aspect.
Figure 3B:
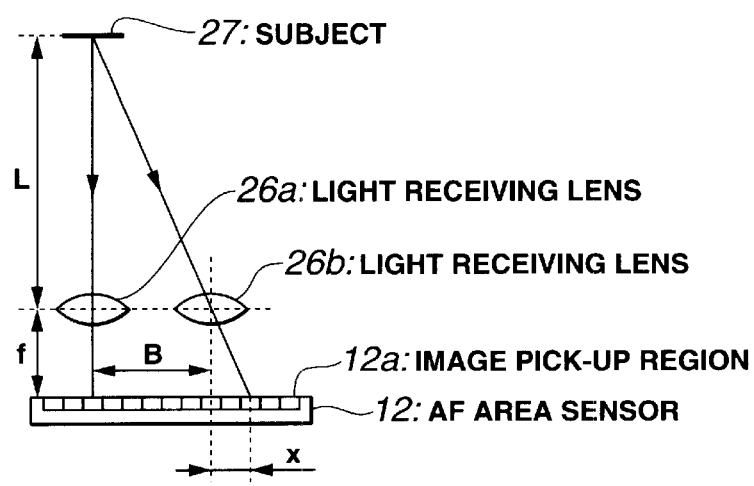

FIG. 3A and FIG. 3B are a perspective view and plan view representing the deployment of a ranging optical system and an AF area sensor.

The ranging system in this camera is configured so that the distance to an object is measured with an outside light passive scheme.

This ranging optical system is configured so that it has light receiving lenses 26a and 26b that constitute a pair of image formation optical systems, as diagrammed in FIG. 3A. These light receiving lenses 26a and 26b are deployed separated by a baseline length B, as diagrammed in FIG. 3B.

The image of an object 27 is divided into two images by the light receiving lenses 26a and 26b, and images are formed, respectively, in the image pick-up region 12a of the AF area sensor 12.

If the relative positional difference on the AF area sensor 12 between the two images divided in that manner is taken as x, then, according to the triangulation distance principle (cf. FIG. 3B), the distance to the object L can be calculated by formula 1 given below from the focal length f of the light receiving lenses and the baseline length B.

Formula 1

$$L=(B \cdot f)/x$$

Provision is made so that a ranging computation using such a formula as 1 above is performed by the microcomputer 11. More specifically, the microcomputer 11 sets a ranging block in the image pick-up region 12a in the AF area sensor 12, performs a correlation computation using sensor data corresponding to the two images, and detects the relative positional difference x between the two images. Then the distance to the object L is calculated based on formula 1 above.

Figure 4:
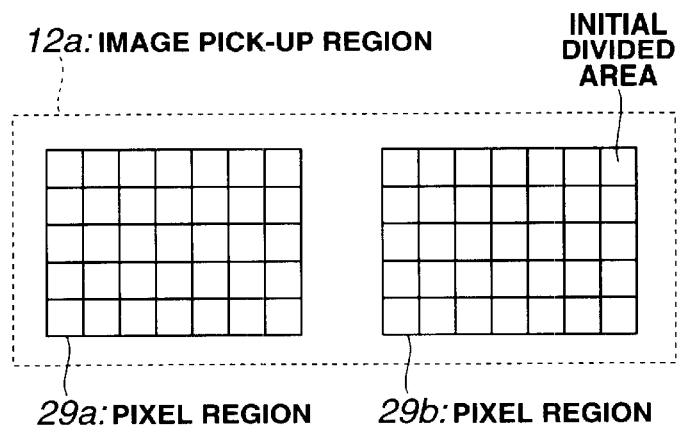
FIG. 4 is a diagram representing the pixel regions and initial division area of the AF area sensor in the first embodiment aspect.

Next, FIG. 4 is a diagram representing pixel regions and an initial divided area in the AF area sensor 12.

As described in the foregoing, provision is made so that, when performing a ranging computation, the image pick-up region 12a that is the light receiving region of the AF area sensor 12 is divided in correspondence with the light receiving lenses 26a and 26b, respectively, and the regions divided at that time are the pixel regions 29a and 29b indicated in FIG. 4. These pixel regions 29a and 29b are configured further so that they have a plurality of initial divided areas, as diagrammed, respectively.

Figure 5:
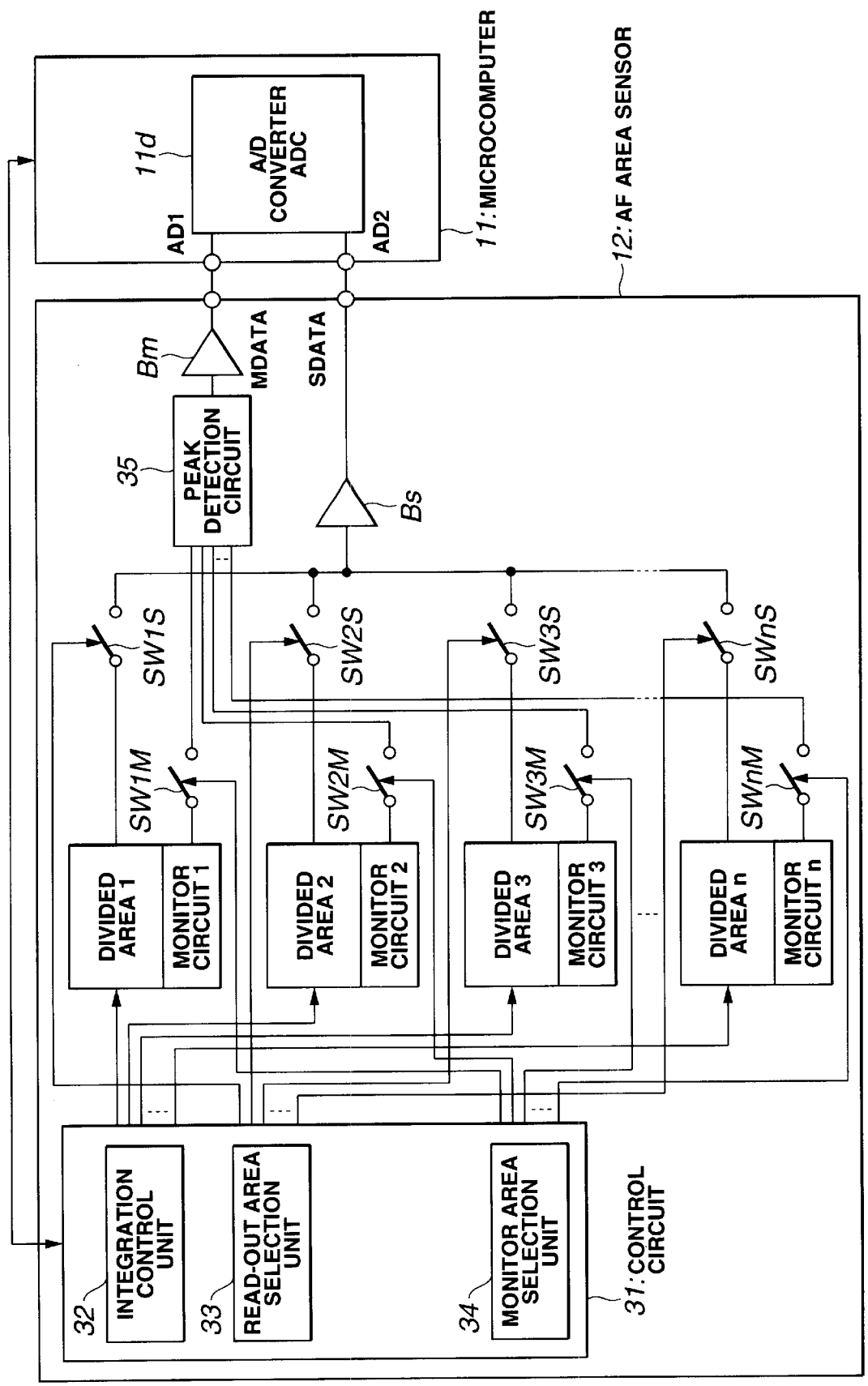
FIG. 5 is a block diagram representing the internal configuration of the AF area sensor in the first embodiment aspect.

Moving on, FIG. 5 is a block diagram representing the internal configuration of the AF area sensor 12.

A control circuit 31 is a block for controlling the overall operations of the AF area sensor 12 based on commands from the microcomputer 11, configured so as to have an integration control unit 32 constituting integration control means, a read-out area selection unit 33 constituting region setting means, and a monitor area selection unit 34.

The pixel regions 29a and 29b are divided into a plurality of divided areas 1, 2, 3, . . . , n, which divided areas, respectively, have monitor circuits 1, 2, 3, . . . , n. These monitor circuits are for generating analog voltages for monitoring information on the quantity of pixels accumulated inside the divided areas. The monitor outputs thereof are outputs which for example indicate peaks (maximum values) in the accumulation quantities of pixels in the divided areas.

The integration control unit 32 outputs integration start signals and integration stop signals to the divided areas on command from the microcomputer 11.

The read-out area selection unit 33 selects divided areas for sensor data read-out on command from the microcomputer 11.

And the monitor area selection unit 34 selects the divided area monitor circuits on command from the microcomputer 11.

The sensor data outputs from the divided areas are selected with on-off switches SW1S, SW2S, SW3S, . . . , SWnS by the read-out area selection unit 33, and input via a buffer Bs from a terminal SDATA to an A/D converter 11d (AD2) in the microcomputer 11.

Monitor data from the divided areas, furthermore, are selected with on-off switches SW1M, SW2M, SW3M, SWnM by the monitor area selection unit 34, and next input to a peak detection circuit 35.

That peak detection circuit 35 is a circuit that detects the peak value where the accumulation quantity is maximum in the monitor data selectively input, and outputs the voltage level thereof. When all divided area monitor data are input, for example (that is, when all of the switches SW1M, SW2M, SW3M, . . . , SWnM are on), the peak monitor level in all of the divided areas is output.

When the monitor data input are one data unit, the peak detection circuit 35 functions as a simple buffer and outputs a signal identical to the input monitor data.

The output from the peak detection circuit 35 is input via a buffer Bm from the terminal MDAT to the A/D converter 11d (AD1) in the microcomputer 11.

Figure 6:
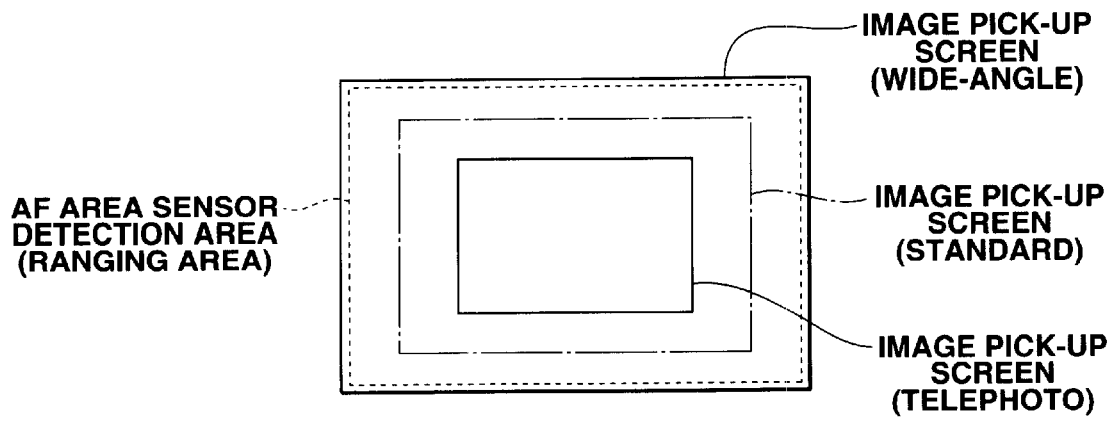
FIG. 6 is a diagram representing the relationships between a ranging region and a standard, wide-angle, and telephoto image pick-up screen in the first embodiment aspect.

FIG. 6 is a diagram that represents the relationship between the ranging region and the standard, wide-angle, or telephoto image pick-up screen.

The ranging system adopted for this camera employs the external light ranging scheme described above, wherefore parallax exists between the image pick-up screen and the ranging region. For that reason, the configuration is such that the regions used for ranging are limited according to the photographic optical system focal length information (zoom information).

The ranging area position compensation data responsive to such focal length changes are stored beforehand in the EEPROM 11e, and are deployed in the RAM 11c as described in the foregoing when initializing the microcomputer 11.

The microcomputer 11 references that compensation data according to the zoom position of the zoom lens on which a zooming operation has been effected by the operation of the zoom switch, and determines the divided areas to be used in ranging operations in the image pick-up region 12a of the AF area sensor 12.

The microcomputer 11 then instructs the read-out area selection unit 33 in the AF area sensor 12, effecting control so that only the sensor data in the determined divided area range are output, and performs a ranging computation using the sensor data in that divided area range.

The microcomputer 11 also outputs control signals to the monitor area selection unit 34 in the AF area sensor 12 so that a monitor signal corresponding to the interior of that divided area is generated.

In response thereto, the AF area sensor 12 outputs the monitor signal within the range of the designated divided area to the microcomputer 11. The microcomputer 11 references that monitor signal and effects control so that the integration quantity attains a prescribed level.

In this manner, provision is made so that, when the camera shooting range is changed by a zoom operation, a ranging operation can be performed without being influenced by a subject that is off the image pick-up screen.

Figure 7:
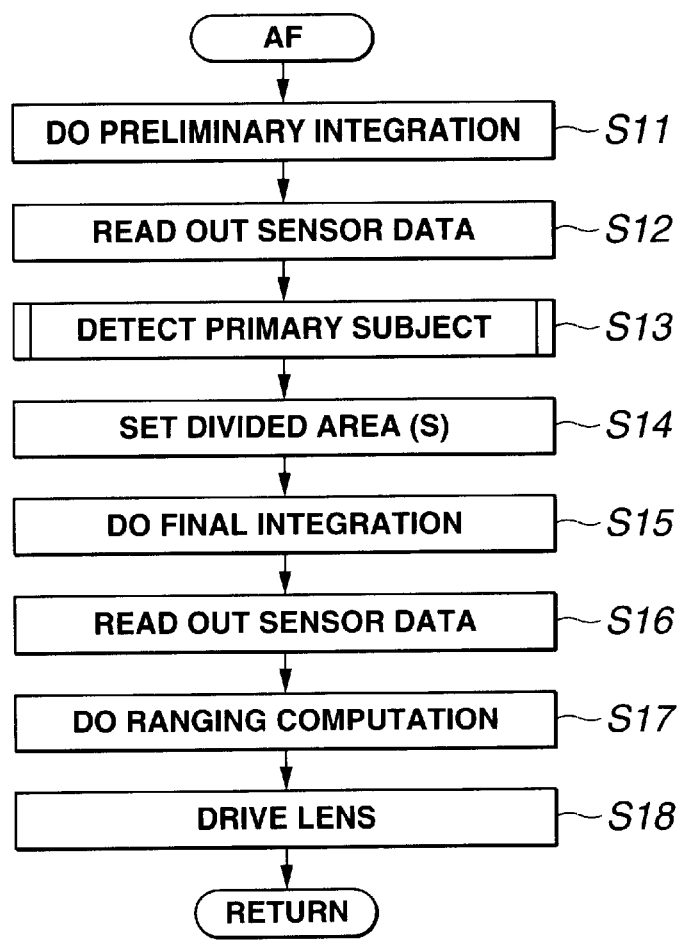
FIG. 7 is a flowchart of AF routines in the first embodiment aspect.
Figure 8:
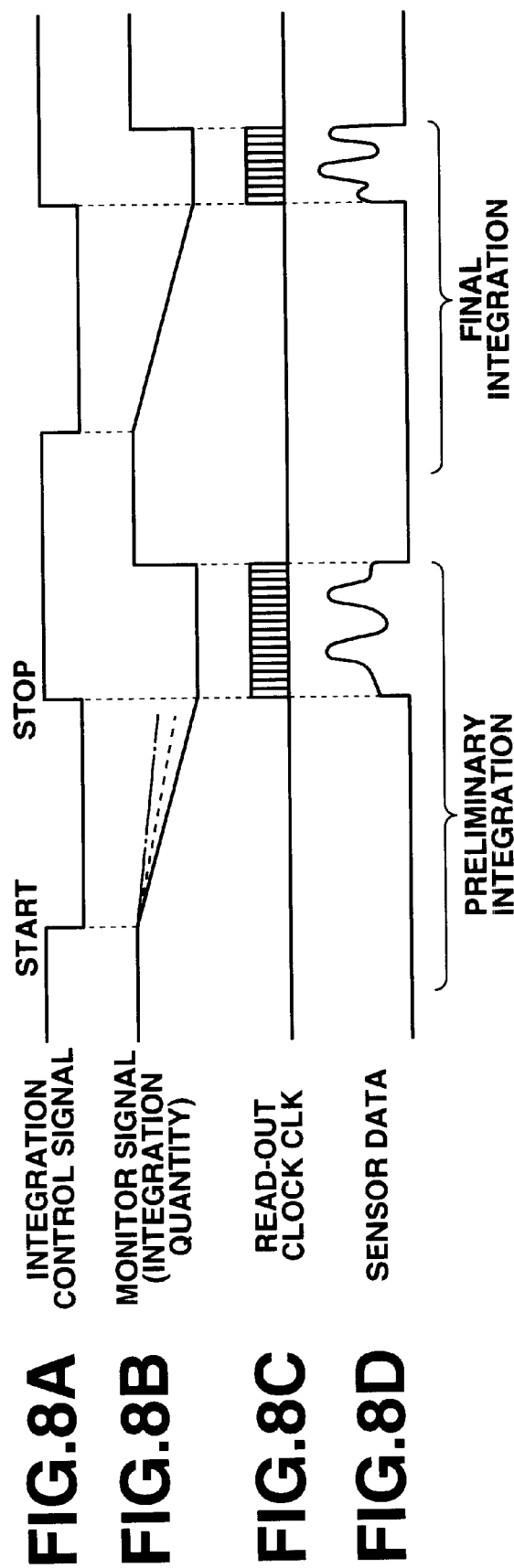
FIGS. 8A, 8B, 8C, and 8D are timing charts representing the behavior of signals during AF operations in the first embodiment aspect.

Moving on, FIG. 7 is a flowchart of an AF routine, while FIGS. 8A, 8B, 8C, and 8D are timing charts representing the behavior of signals during AF operations. The description below follows FIG. 7, making reference to FIGS. 8A, 8B, 8C, and 8D.

In the main routine diagrammed in FIG. 2, when the AF routine is called in step S3, that AF operation is started.

Then, first of all, a preliminary integration is performed (step S11). In that preliminary integration, all of the divided areas of the AF area sensor 12 in the pixel regions corresponding to the image pick-up screen are set. That is, all of the switches SW1M, SW2M, SW3M, . . . , SWnM are turned on by the monitor area selection unit 34, and integration control is effected based on the monitor peak values for the entirety of the pixel regions corresponding to the image pick-up screen.

In other words, an integration start signal such as diagrammed in FIG. 8A is output from the integration control unit 32, and integration operations are started for all of the divided areas in the AF area sensor 12. Also, monitor data as diagrammed in FIG. 8B input from the terminal MDATA are monitored, and, when an appropriate monitor level is reached, integration is stopped by the integration control unit 32.

Next, sensor data read-out is performed (step S12). As diagrammed in FIG. 8C, while outputting a read-out signal CLK to the AF area sensor 12, divided areas are selected, and, as diagrammed in FIG. 8D, sensor data are sequentially output to the A/D converter 11*d*. These sensor data are converted to digital signals and read out by that A/D converter 11*d* and stored in the RAM 11*c*.

Next, primary subject detection is performed for the sensor data obtained as a result of the preliminary integration operation described earlier (step S13), and the divided areas are determined on the basis of the results of that primary object position detection (step S14).

After that, final integration is performed for each of those divided areas (step S15). In these final integrations, monitor signals are output from the monitor circuits of the divided areas in the AF area sensor 12 (cf. FIG. 8B). While sequentially referencing these monitor signals for each divided area, or effecting control to find an appropriate integration time interval based on the sensor data and the integration time interval during the preliminary integration operation, integration control is performed so that the accumulation quantity becomes appropriate.

Next, sensor data read-out is performed (step S16). Here, while outputting a read-out clock signal (cf. FIG. 8C) to the AF area sensor 12, a command is output to the read-out area selection unit 33 and divided areas are selected, and the sensor data are output sequentially to the A/D converter 11*d* (cf. FIG. 8D). These sensor data are A/D converted and read out, and stored in the RAM 11*c*.

Next, based on the sensor data obtained, a ranging computation is performed for each divided area (step S17), the focus lens 14 noted earlier is driven, based on the ranging data obtained (step S18), and the main routine is then returned to.

Figure 9:
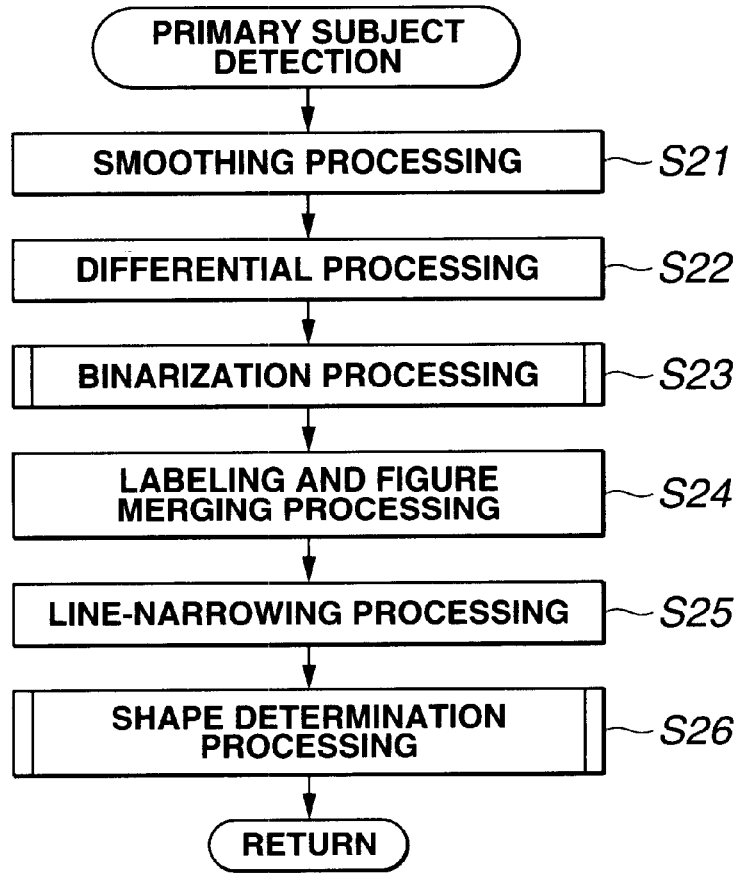
FIG. 9 is a flowchart representing details of a primary object detection operation in the first embodiment aspect.

Moving on, FIG. 9 is a flowchart representing the details of the primary object detection operation.

In the AF processing diagrammed in FIG. 7, in step S13, when a primary object detection processing routine is called, the operation diagrammed in FIG. 9 is started.

In this primary object detection routine, the particular case is assumed where the primary object is a person, and the case where that person is detected is described.

Two images are obtained by output from the pixel regions 29*a* and 29*b* of the AF area sensor 12 described in the foregoing, but the image data (sensor data) used for detecting the primary object may be for one or other of those images, or, alternatively, both images may be used. The sensor data read out from the AF area sensor 12 are stored in the RAM 11*c* inside the microcomputer 11, and the processing described below is performed based on those sensor data.

First, smoothing processing is performed (step S21). This smoothing processing is processing for removing random noise in the image or images, by performing filtering processing or Fourier transforms, for example. Such random noise is generated because of random noise present in the AF area sensor 12 itself or because of outside noise produced when the voltage changes in the power supply for the AF area sensor 12.

Next, the sensor data are subjected to differential processing (step S22). As a result, the edge candidate regions in processing are used to detect edges and the intensities thereof are given.

Then binarization processing is performed, and, by extracting the portion or portions below a certain threshold value for the image, a binary image is found (step S23).

Next, labeling and figure merging processing is performed (step S24), whereupon figures are obtained having a certain width corresponding to the edge(s), wherefore line narrowing processing is performed, employing a line-thinning algorithm, making the line width(s) approximately 1 (step S25).

After that, a process for distinguishing the shape of the image is performed, the primary object is extracted (step S26), and the AF process routine is returned to.

The process routines performed in the primary object detection diagrammed in FIG. 9 are now described in even greater detail.

The smoothing processing in step S21, which is a process for removing random noise that becomes mixed into an image, as described in the foregoing, may be described in greater detail as follows.

There are various stages in this smoothing processing, but a median filter stage for finding the middle value (median) of pixel values in a nearby region, for example, and an edge preserving filter stage wherein a nearby region is divided into small regions, a dispersion is found for each of those small regions, the small regions are found where that dispersion becomes a minimum is found, and the average value thereof is output, are effective.

The median filter described above is object to side effects such as that the edges of an image are softened, and the edge preserving filter, on the other hand, wherewith edges are not softened, is therefore thought to be more effective.

Besides the median filter and edge preserving filter, moreover, there are also means based on Fourier transforms.

Figure 10:
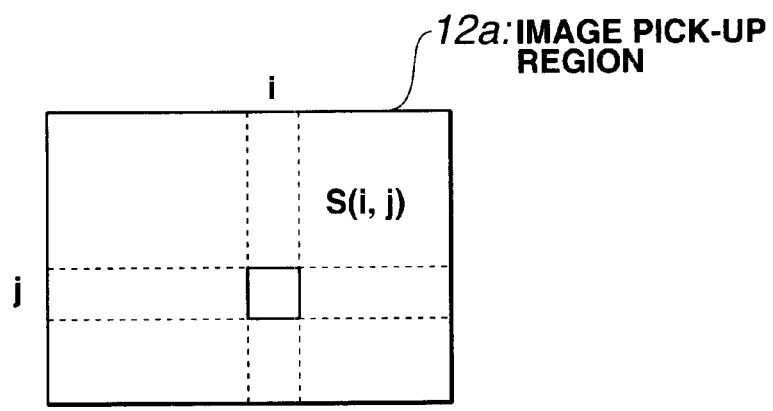
FIG. 10 is a diagram representing the relationship between sensor data and pixel coordinates in an image pick-up region of the AF area sensor in the first embodiment aspect.

Next, the edge detection processing based on differential processing in step S22 is performed as described in greater detail as follows. FIG. 10 is a diagram representing the relationship between sensor data and pixel coordinates in the image pick-up region of the AF area sensor.

As diagrammed in FIG. 10, taking the sensor data at the pixel coordinates (i, j) in the image pick-up region 12*a* as s(i, j), for those sensor data s(i, j), edge detection is performed by performing processing such as that described below.

With a method based on first differential operators, Δxs(i, j) representing the differential in the x dimension of the sensor data s(i, j) and Δys(i, j) representing the differential in the y dimension thereof, respectively, are computed by the formulas given in 2 below.

Formula 2

Δxs(i, j)=s(i, j)−s(i−1, j)

Δys(i, j)=s(i, j)−s(i, j−1)

As a result of performing such computations as these, for original image data such as diagrammed at the upper level in FIG. 11A, for example, the post-processing image data such as diagrammed in the lower level thereof are obtained. FIGS. 11A and 11B are graphs representing image processing based on first differential operators and second differential operators.

With a method based on second differential operators, $\Delta^2$xs(i, j) representing the second differential in the x dimension of the sensor data s(i, j) and $\Delta^2$ys(i, j) representing the second differential in the y dimension thereof, respectively, are computed by the formulas given in 3 below.

Formula 3

$\Delta^2$xs(i, j)=s(i−1, j)−2s(i, j)+s(i+1, j)

$\Delta^2$ys(i, j)=s(i, j−1)−2s(i, j)+s(i, j+1)

With a Laplacian operator that is one type of second differential operator, in order to emphasize the portion at the shoulder of the edge, for original image data as diagrammed in the upper level of FIG. 11B that are original image data like that diagrammed at the upper level in FIG. 11A, image data are obtained after processing wherein a transition is made from a positive region to a negative region, as diagrammed in the lower level in FIG. 11B. By finding the portion where 0 is attained in the image data after such processing, the edge position can be calculated.

As a method for specifically processing formulas like those given above, provision is made for processing by performing sum of products computations for the sensor data s(i, j) and space filter tables (weight tables) such as are given in FIGS. 12A, 12B, 12C, and 12D. FIGS. 12A, 12B, 12C, and 12D are diagrams representing examples of space filter tables.

FIG. 12A is an example of a filter table in a first differential operator in the horizontal dimension, while FIG. 12B is an example of a filter table in a first differential operator in the vertical dimension.

FIG. 12C, moreover, represents an example of a filter table in a Laplacian operator that is a second differential operator.

FIG. 12D, furthermore, represents an example of a filter table in a tsobel operator. The vertical lines on the two flanks of the table indicate that absolute values are taken, sum of products computations are performed between the sensor data s(i, j) and the table representing a first differential in the x dimension, other sum of products computations are performed between the sensor data s(i, j) and the table representing a first differential in the y dimension, then the respective absolute values are taken, and, finally, processing is done to add those absolute values.

If the space filters diagrammed in FIGS. 12A, 12B, 12C, and 12D, as noted above, are represented as W(i, j), the sensor data S'(x, y) after processing can be calculated using formula 4 given below from the sensor data S(x, y) before processing.

Formula 4

$$S'(x, y) = \frac{1}{n} \sum_{i=-1, j=-1}^{1,1} S(x+i, y+i) \cdot W(i, j)$$

where S(x, y) indicates sensor data before processing, S'(x, y) sensor data after processing, W(i, j) a space filter, and n a constant.

The space filter W(i, j) in such a formula as 4 above is selected according to the situation from various types such as are diagrammed in FIGS. 12A, 12B, 12C, and 12D. Specific examples of making this selection according to the situation are given below.

When the image data for all pixels are to be objected to differential processing, it is well to use first differential operators wherewith computations are comparatively simple and fast, or Laplacian operators.

When only some images in the image pick-up screen are to be subjected to differential processing, it is well to select and use tsobel operators wherewith great effectiveness is obtained although the computations are somewhat complex and the computation time great.

In cases where the AF area sensor 12 integration time becomes long due to the brightness of the object being low, provision may be made so that first differential operators or Laplacian operators are used, while, on the other hand, when integration time is short with objects of high brightness, provision may be made so that the AF time lag is balanced by using tsobel operators.

Figure 13:
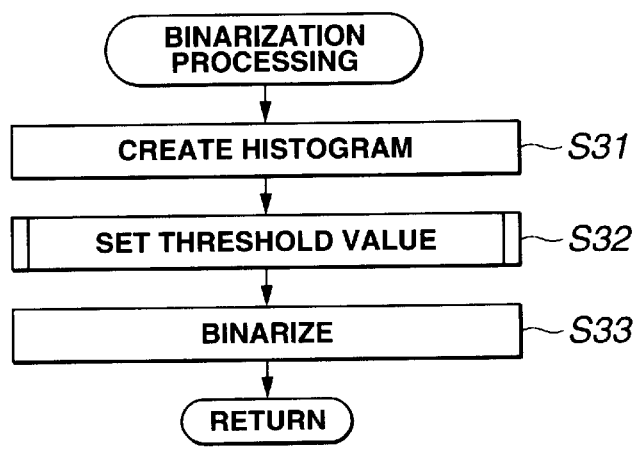
FIG. 13 is a flowchart of binarization processing in the first embodiment aspect.
Figure 14A:
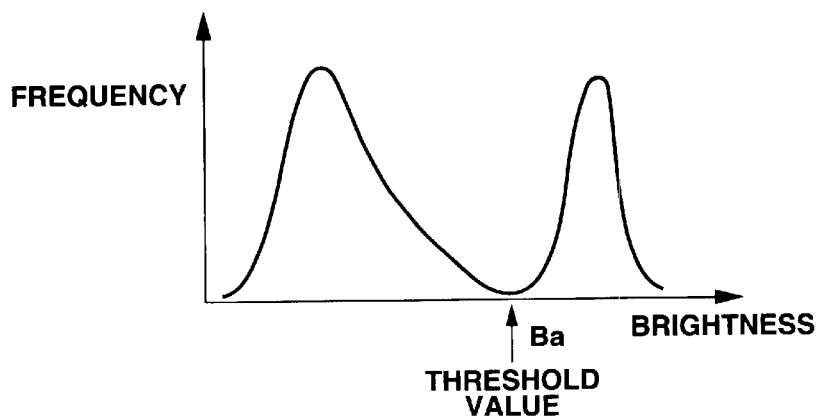
FIGS. 14A and 14B are graphs showing how threshold values are set based on a histogram, in the first embodiment aspect.
Figure 14B:
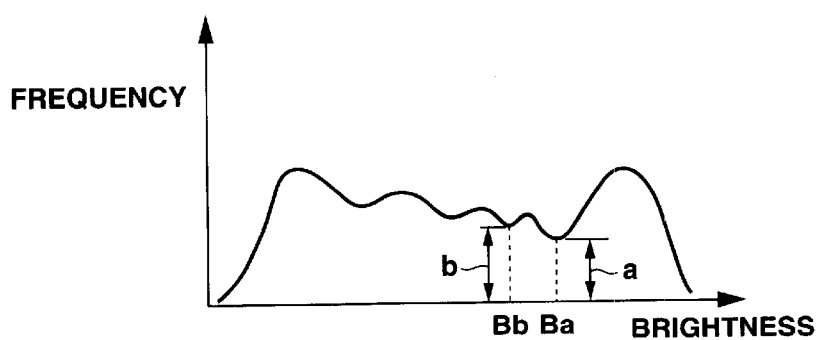

Next, FIG. 13 is a flowchart of binary processing (threshold value processing), while FIGS. 14A and 14B are graphs that show how threshold values are set based on histograms.

In the primary object detection processing diagrammed in FIG. 9, when the binary processing routine is called in step S23, the operations indicated in FIG. 13 are started.

First, a histogram is created that represents the frequency of appearance of pixel values that indicate brightness levels in an image (step S31).

Next, a threshold value is set based on the histogram created (step S32). More specifically, when a mode method is used, for example, a brightness value Ba wherewith the frequency becomes minimum in the histogram created is set as the threshold value (threshold level) (cf. FIG. 14A).

Binarization is then performed based on that threshold value (threshold level) (step S33), and the calling routine is returned to.

In step S32 described above, furthermore, the method of determining the threshold value based on a histogram is not limited to a mode method, and there are various other methods.

A number of such methods may be cited, including, for example, the p-tile method that is effective when the surface area of the figure pulled out is to some degree known, the differential histogram method that establishes the threshold value so that it occurs at a boundary portion of the figure, the distinguishing analysis method that finds a parameter t so that, when the set of density values is divided into two classes, the separation between classes is optimized, and the variable threshold method that causes the threshold value to vary according to the image position.

In step S32, one or other of these methods is selected and used so as to best accord with the situation.

For example, when the shape of the histogram is distinguished, and a determination is made as to whether or not a clear minimum value exists, the mode method is adopted when such does clearly exist. When such does not exist, on the other hand, or when it exists but is not clear, the distinguishing analysis method is adopted.

In this manner, the shape of the histogram is distinguished, and a threshold setting method is adopted according to the results thereof. For the method used in distinguishing the shape of the histogram at this time, a value a that is an extreme value (valley) that is also a frequency minimum value (where the brightness value is Ba), and a value b that is an extreme value (valley) where the frequency is the second smallest (where the brightness is Bb) are found, for example, as diagrammed in FIG. 14B, and the difference therebetween b - a is compared with a prescribed determined value $d_{th}$.

When, as a result of that comparison, b - a is larger than the prescribed value $d_{th}$, the brightness value Ba for the minimum value a is adopted as the threshold value, whereas, when it is equal to or less than the prescribed value $d_{th}$, the variable threshold value method that varies the threshold value according to the image position is adopted.

Figure 15:
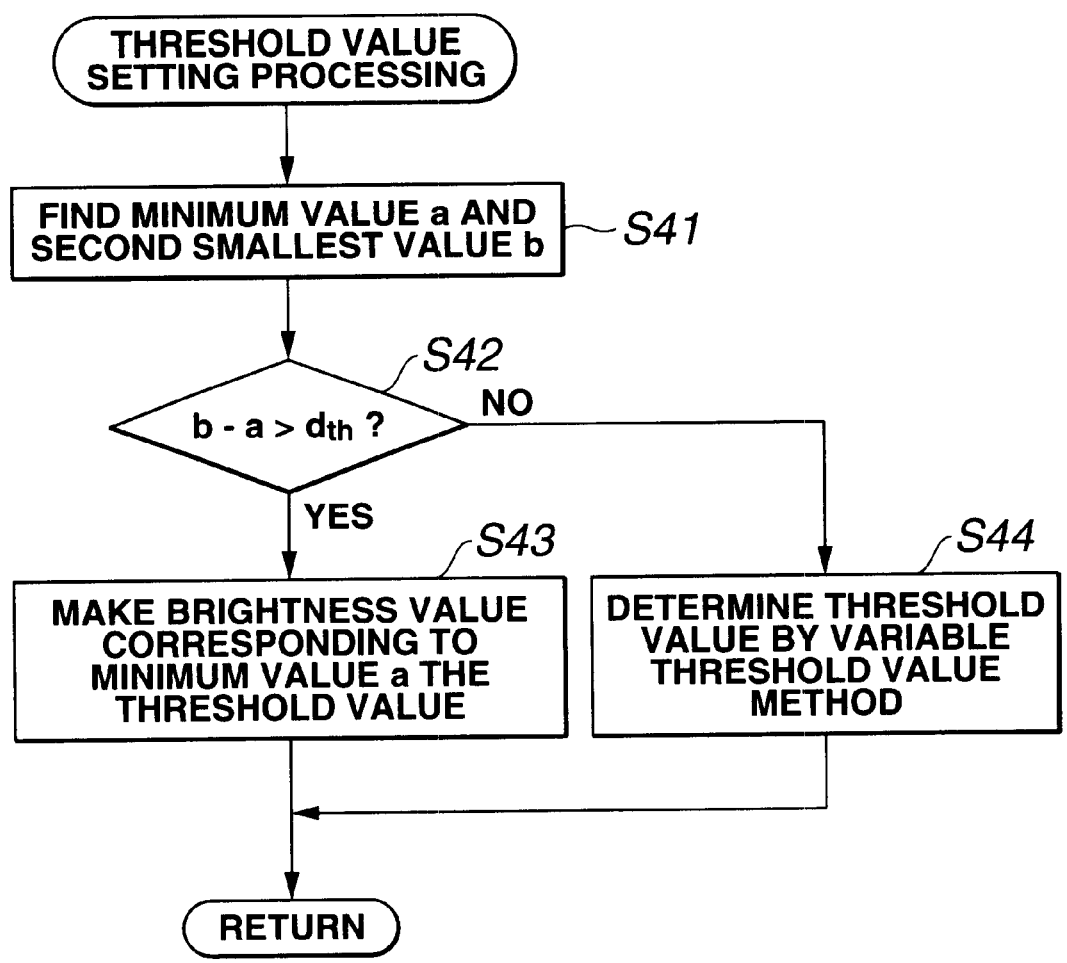
FIG. 15 is a flowchart of threshold value setting processing in the first embodiment aspect.

FIG. 15 is a flowchart for such threshold value setting processing.

In the binarization processing indicated in FIG. 13, when the threshold value setting process routine is called in step S32, the operations indicated in FIG. 15 are started.

First, the frequency minimum value a and the second smallest frequency value b are found (step S41), and the prescribed determined value $d_{th}$ is compared against (b - a) to see which is greater (step S42).

Thereupon, when (b - a) is larger than the determined value $d_{th}$, the brightness value Ba corresponding to the minimum value a is adopted as the threshold value (step S43), whereas, when (b - a) is equal to or less than the determined value $d_{th}$, the variable threshold value method is adopted (step S44) and the calling routine is returned to.

Furthermore, when binarization processing is performed for an image corresponding to the entire image pick-up screen, binarization processing is performed after setting the threshold value first by the mode method. Provision may also be made so that, when the binarized image is evaluated and found not to be good, the image will be divided into a plurality of blocks, a histogram created for each divided block, and a threshold value newly set for each divided block.

The various kinds of processing performed in the primary object detection processing indicated in FIG. 9 may now be summarized as follows.

First, the labeling done in step S24 is a process of applying labels to linked portion masses where pixels having the same brightness in the image are mutually linked. That is, different labels are applied to different linked portions to distinguish them, and the regions (linked regions) are separated (cf. labelings 1 to 6 in FIG. 17B).

The figure merging process in step S24 is processing for removing noise such as holes. That is, not only are point figures or figures of small area such as holes contained in an image not essentially effective, but they have the potential to adversely affect subsequent processing, wherefore they constitute noise that needs to be removed. That being so, this processing expands or reduces the original figure and removes such noise components.

The line thinning in step S25 is processing to which the obtained binary image is subjected, wherein the individual linked regions contained therein are processed so that they are thinned to line figures having a line width of 1, without impairing the linkage. More specifically, processing is performed wherein, in a line-form figure of any thickness, the center line in the line figure is found by successively removing pixels in the width dimension thereof.

The image shape determination in step S26 is performed using the coefficient e given in formula 5 below.

Formula 5

$$e = (\text{peripheral length})^2 / (\text{surface area})$$

The surface area in this formula is the number of pixels belonging to the linked regions in view, and the peripheral length is the number of pixels positioned at the boundaries surrounding those linked regions. However, when calculating the peripheral length, the portions oriented in a diagonal direction are corrected by a factor of 2 relative to the portions oriented in the horizontal or vertical directions.

The coefficient e given in formula 5 above represents the minimum value when the figure is circular. This is a coefficient that takes on a progressively larger value as the figure becomes more complex. The face of a person can be considered to form a shape that is more or less circular, wherefore a determination as to whether or not the image at issue is the face of a person can be made by comparing the coefficient e with a prescribed value.

Also, because the surface area of the face of a person is of a more or less determined size, when the distance to the object and the focal length of the photographic lens are determined, the surface area formed as an image inside the image pick-up region can be more or less specified. Thereupon, by comparing the surface area of the linked regions noted earlier with a prescribed value, it becomes possible to determine more precisely whether or not the image at issue is the face of a person.

Provision may also be made so that, prior to performing figure determination, the surface area is compared to values in a prescribed range, a judgment made that this is not the image of a person when that prescribed range is exceeded, and the shape determination processing omitted. If such processing as this is performed, the computation volume can be reduced and the AF time lag shortened.

Figure 16:
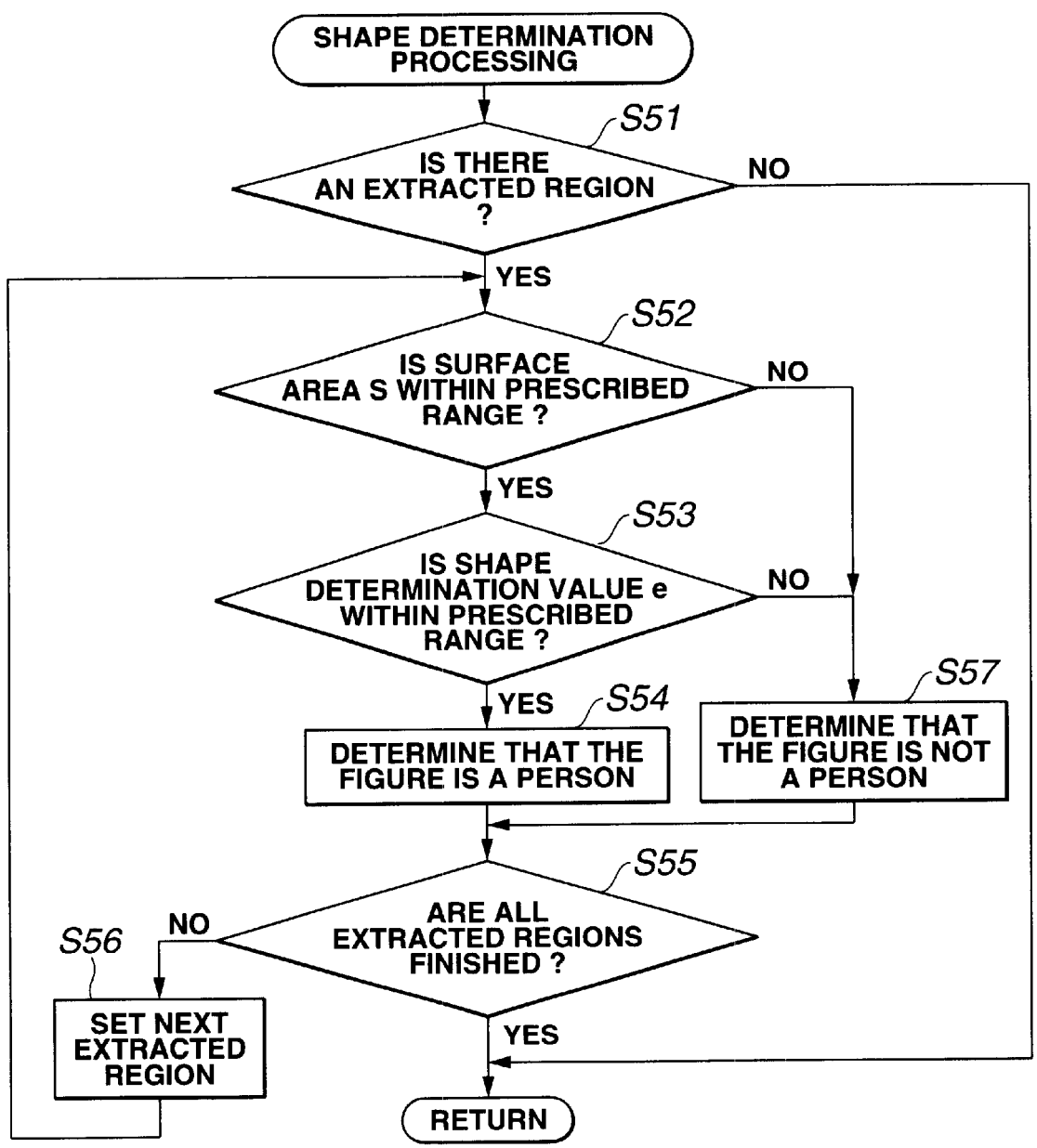
FIG. 16 is a flowchart for shape determination processing in the first embodiment aspect.

FIG. 16 is a flowchart of shape determination processing.

In the primary object detection processing indicated in FIG. 9, when the shape determination processing routine is called in step S26, the operations indicated in FIG. 16 are started.

First, a judgment is made as to whether or not the extracted region exists (step S51). When there is no extracted region, the calling routine is returned to.

When, on the other hand, an extracted region does exist, the surface area S of that extracted region is found and a judgment is made as to whether or not that value is within a prescribed range (step S52).

When here the extracted region area S is within the prescribed range, the figure determination value e is next calculated, and a judgment made as to whether or not this is within a prescribed range (step S53).

When this figure determination value e is within the prescribed range, it is judged that the image in the extracted region is the image of a person (step S54).

When in step S52 the surface area S of the extracted region is not within the prescribed range, or when in step S54 the figure determination value e is not within the prescribed range, it is judged that the image in the extracted region is an image other than that of a person (step S57).

When these judgments have been made in step S54 or step S57, a judgment is next made as to whether or not figure determinations have been made for all of the extracted regions (step S55), and, when such have not finished, the next extracted region is set (step S56) and the operations in step S52 and following described in the foregoing are repeated.

Thus, as soon as it has been judged in step S55 that figure determinations have been performed for all of the extracted regions, this processing is ended and the calling routine is returned to.

Next, FIGS. 17A, 17B, 17C, and 17D are diagrams representing the appearance of image data processed when performing person determinations by the shape determination processing described in the foregoing.

First, FIG. 17A represents the appearance of the original image in one example, which is the appearance of an image formed in the image pick-up region 12a of the AF area sensor 12 corresponding to the image pick-up screen.

Next, FIG. 17B represents the appearance of the image after performing the differential processing and binarization processing described earlier. At this time, the image is one wherein only the edge portions indicating contours are extracted, with labeling processing effected in each extracted area (cf. labelings 1 to 6 in the drawing).

Further, FIG. 17C is a diagram representing the setting of a person determination region and divided area.

When it is judged that the region corresponding to the labeling 2 in the diagram given in FIG. 17B is an image that contains the face of a person, that person determination region 41 is extracted.

With all of the portions up to the portions noted above being portions related to primary object detection, the portions for the next divided area setting are now described.

As diagrammed in FIG. 17C, a plurality of divided areas is integrated and a divided area 42 set so as to contain the person determination region 41 that is the primary object, and final integration is performed on the basis of a monitor signal for that divided area 42.

That is, in the configuration diagrammed in FIG. 5, noted earlier, the output of the monitor circuit corresponding to the divided area 42 is selected by the monitor area selection unit 34 and input to the peak detection circuit 35.

Thereupon, the integration control unit 32 begins the integration operation, and the integration is terminated so that an appropriate accumulation quantity is effected with reference to the monitor signal (terminal MDATA output) that is the output of the peak detection circuit 35.

Next, sensor data of the divided area corresponding to the person determination region 41 set by the read-out area selection unit 33 are read out.

Thus appropriate sensor data are obtained for the person determination region 41.

The divided area 42 here is set as a single area, but that poses no limitation, and a plurality of divided areas may be set.

Moving on, in FIG. 17D, the person determination region 41 and a ranging area group 43 that is a plurality of ranging areas set inside the person determination region 41 are represented.

Using the sensor data obtained as described in the foregoing, a plurality of ranging areas is set inside the person determination region 41 as diagrammed here in FIG. 17D, and ranging computations are performed for those ranging areas, respectively.

From the results of the plurality of ranging computations, one set of ranging data can be obtained, either by making a closest-range selection, or by taking the average, etc.

As described in the foregoing, based on the results of the primary object detection based on a preliminary integration, a divided area or areas are newly set, and integration control is performed based on the divided area or areas set, wherefore appropriate image data can be obtained wherein the primary object is focused.

According to this first embodiment aspect, appropriate integration control can be performed across a broad range, wherefore it is possible to raise the detection precision. Also, because special high-speed control circuits and area sensor circuits are unnecessary, costs are not increased.

Figure 18:
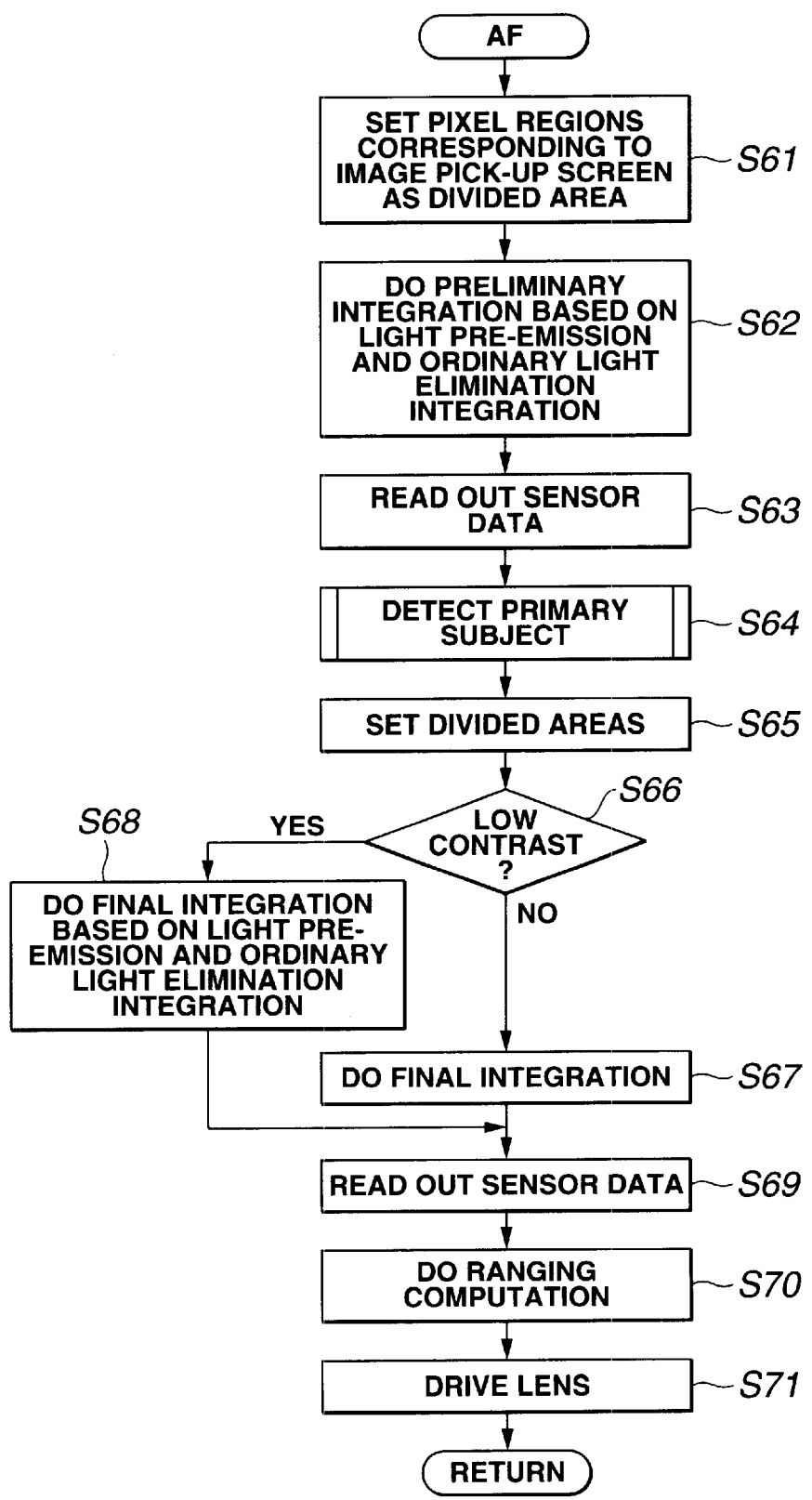
FIG. 18 is a flowchart of AF routines in a second embodiment aspect of the present invention.
Figure 19A:
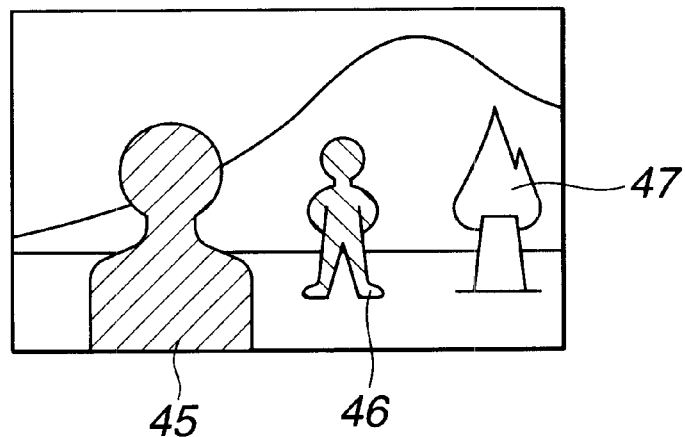
FIGS. 19A, 19B, and 19C are diagrams showing how primary object selection is made causing light to be pre-emitted in a photographic scene, in the second embodiment aspect.
Figure 19B:
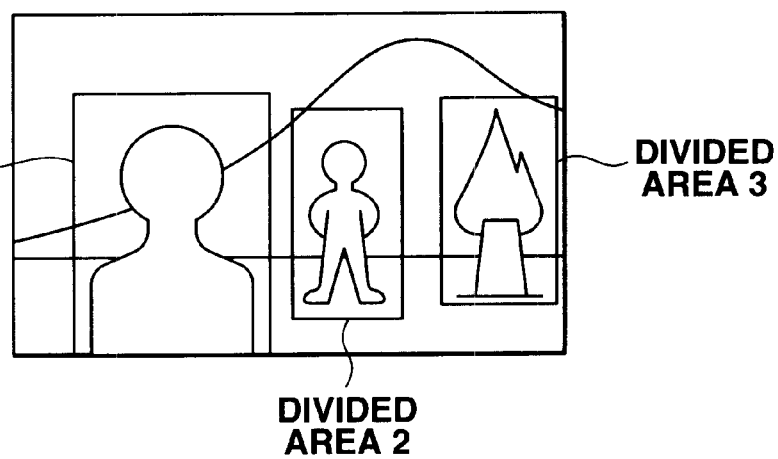
Figure 19C:
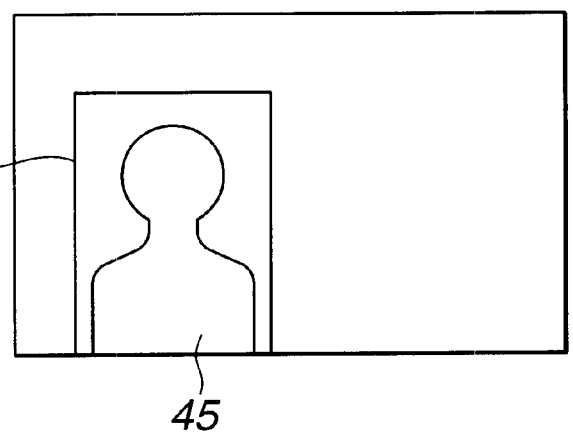
Figure 20:
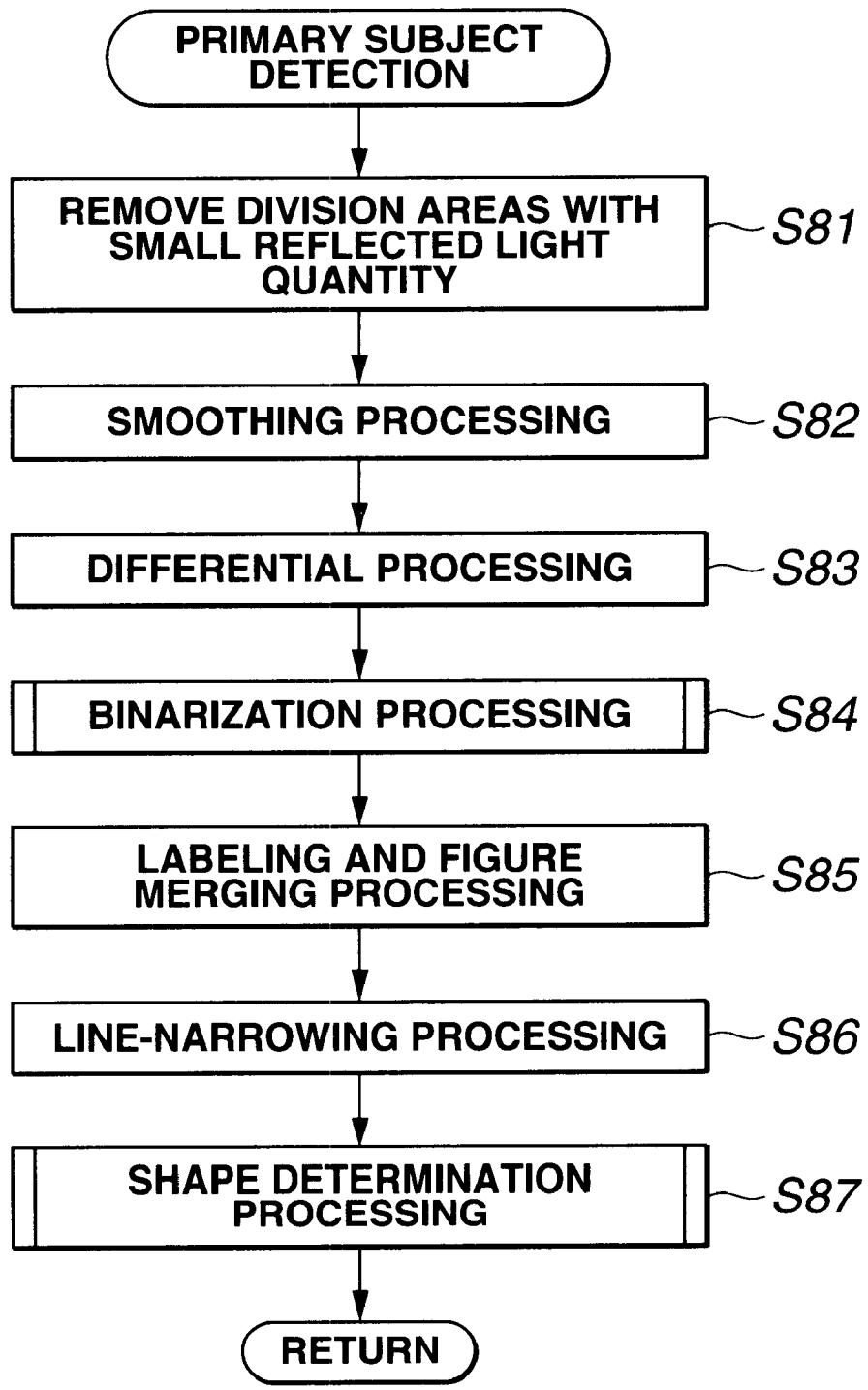
FIG. 20 is a flowchart of primary object detection processing in the second embodiment aspect.

FIGS. 18 to 21E represent a second embodiment aspect of the present invention. FIG. 18 is a flowchart of an AF routine; FIGS. 19A, 19B, and 19C diagram how, in a photographic scene, light is pre-emitted and the primary object selected; FIG. 20 is a flowchart of primary object detection processing; and FIGS. 21A, 21B, 21C, 21D, and 21E are timing charts representing the behavior of signals when performing preliminary integration and final integration. In this second embodiment aspect, portions that are the same as in the first embodiment aspect described in the foregoing are not further described; the description focuses primarily on the points of difference therebetween.

The AF routine indicated in FIG. 18 is a modification of the AF routine given in FIG. 7 in the first embodiment aspect.

In the main routine given in FIG. 2, when the AF routine is called in step S3, that AF operation is started.

First, the image region corresponding to the overall image pick-up screen is set as one divided area (step S61).

Here, instead of performing the preliminary integration in step S11 in FIG. 7, preliminary integration is performed based on light pre-emission and ordinary light elimination integration (step S62), sensor data are read out (step S63), and the primary object is detected (step S64).

The reason for this is that, when an AF routine as shown in FIG. 7 is employed for a photographic scene as shown in FIG. 19A, detection operations are also effected to detect a primary object, other than the primary object 45, in the background scenes 46 and 47 (cf. FIG. 19B), whereupon there is a possibility that excessive processing will be generated and the time lag made larger.

In order to resolve this, in this preliminary integration, ordinary light removal integration is performed on the AF area sensor 12 while causing the strobe 20a to make a plurality of pre-emissions (cf. the portions for the preliminary integrations in FIGS. 21A, 21B, 21C, 21D, and 21E). Because the quantity of light reflected from an object as a result of the pre-emissions is greater for the object present at a shorter distance, if integration control is effected at the reflected light quantity peak, the outputs for the objects at greater distances for which the quantity of reflected light is smaller will be eliminated. Thus only the divided area 1 can be selected, for example, as diagrammed in FIG. 19C.

The details of the primary object detection processing in step S64 are now described, making reference to FIG. 20.

The sensor data correspond to the quantity of light reflected from an object as a result of a pre-emission, wherefore the sensor data are analyzed, and the divided areas for which the quantity of such reflected light is smaller than a prescribed quantity, that is, where the object is positioned at a comparatively great distance, are eliminated (step S81). Thus the processing in steps S82 to S87 described below is not performed for those eliminated divided areas.

The processing in steps S82 to S87 described below is the same as the processing in steps S21 to S26 indicated earlier in FIG. 9.

That is, smoothing processing is performed (step S82), the sensor data are subjected to differential processing (step S83), binarizing processing is performed (step S84), labeling and figure merging processing is performed (step S85), line narrowing processing is performed (step S86), and shape determination processing is performed to extract the primary object (step S87), after which the AF routine is returned to.

When that primary object detection processing is finished, the AF routine in FIG. 18 is again returned to, and divided area setting is performed (step S65).

Then, a determination is made as to whether or not the sensor data for the primary object position resulting from the preliminary integration is low contrast (step S66). If it is not low contrast, then an ordinary final integration operation is performed (step S67), but if it is low contrast, then a final integration based on light pre-emission and ordinary light removal integration is performed (step S68) (cf. the final integration portions in FIGS. 21A, 21B, 21C, 21D, and 21E).

After that, the sensor data are read out (step S69), ranging computations are performed (step S70), and the focus lens 14 is driven by the focus lens drive unit 13 based on the ranging results (step S71), whereupon the calling routine is returned to.

According to this second embodiment aspect, while virtually the same effectiveness is demonstrated as with the first embodiment aspect described earlier, provision is made so that, in cases where the object is low contrast, and it is predicted that detection will not be possible with ordinary integration, light pre-emission and ordinary light removal integration are performed to remove the ordinary light component so that high-contrast sensor data can be obtained.

Thus, by removing the ordinary light and capturing the image while projecting auxiliary light, when making the preliminary detection, the influence of the background can be eliminated, the time lag caused by the ranging operation can be made shorter, and it is possible to perform high-precision ranging.

Figures 22A, 22B:
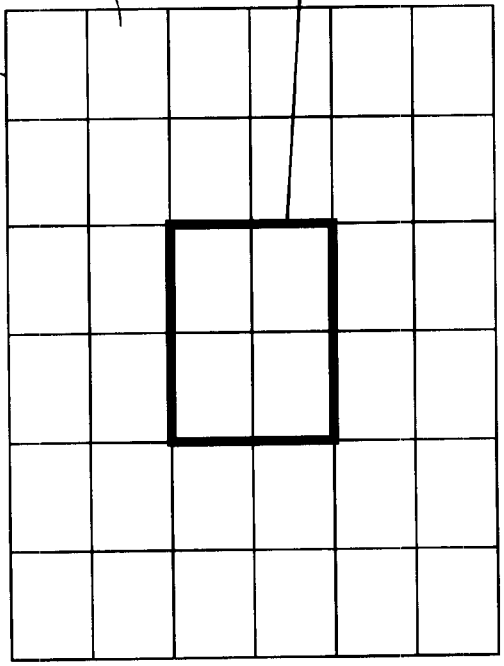
FIGS. 22A and 22B are diagrams representing divided areas at wide-angle and at telephoto settings, in a third embodiment aspect of the present invention.
Figure 23:
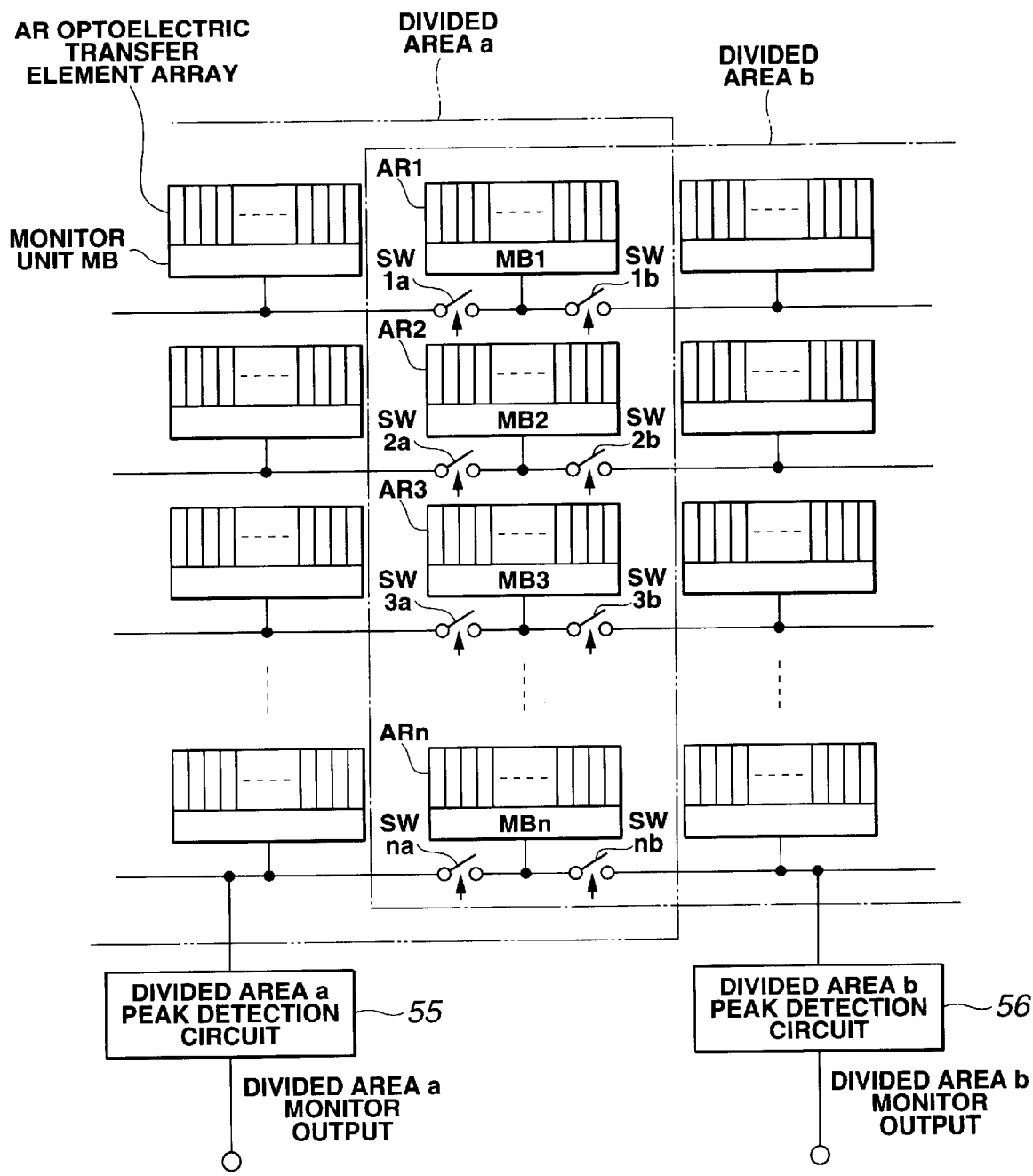
FIG. 23 is a diagram of one part of an AF area sensor in the third embodiment aspect, representing a configuration wherein division areas are switched for each optoelectric transfer element array.
Figure 24:
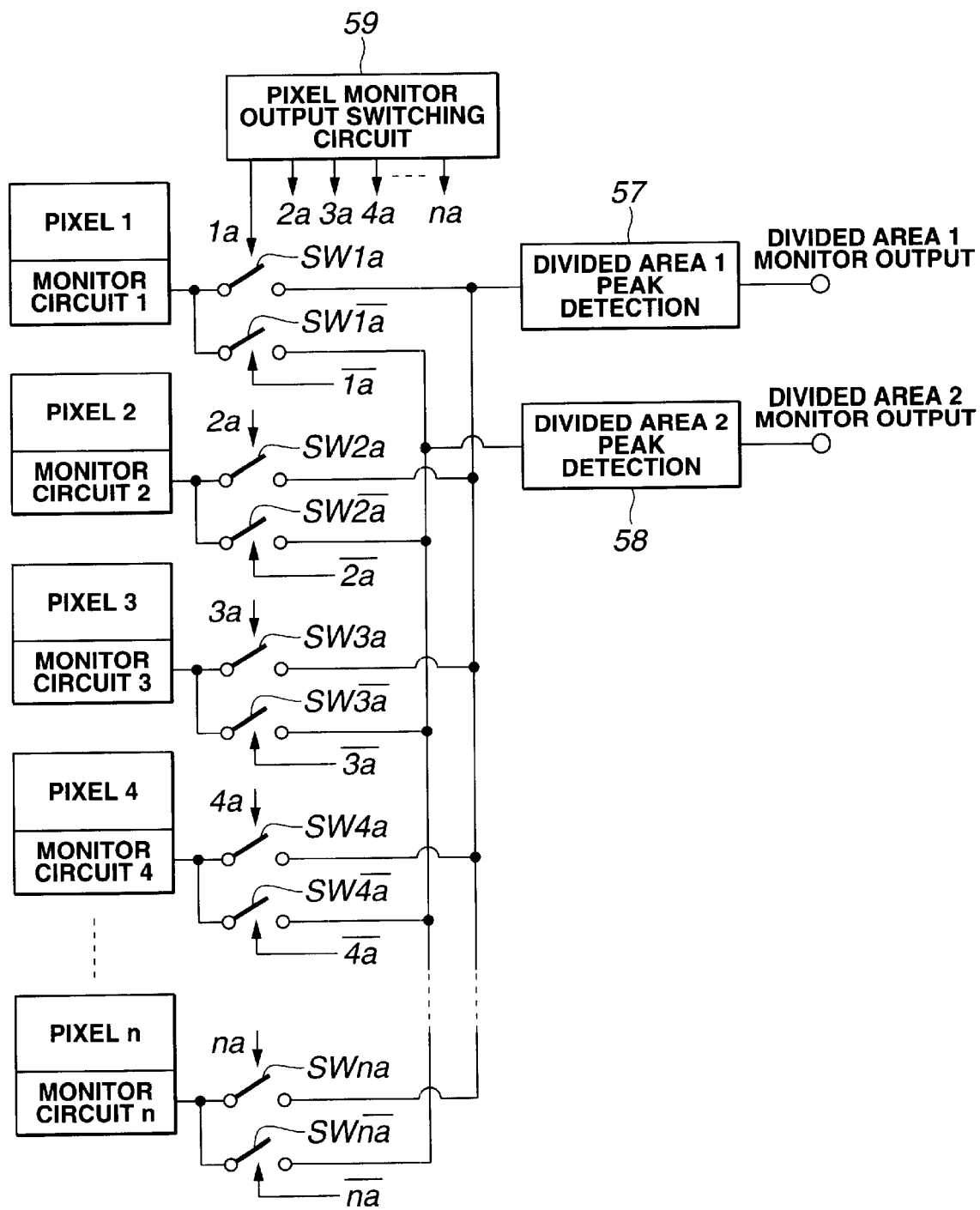
FIG. 24 is a diagram of one part of the AF area sensor in the third embodiment aspect, representing a configuration wherein division areas are switched for each pixel.

FIGS. 22A to 24 represent a third embodiment aspect of the present invention. FIGS. 22A and 22B are diagrams representing a divided area during wide-angle and telephoto operations; FIG. 23 is a diagram of a configuration for switching divided areas in units of optoelectric transfer element arrays, being a portion of an AF area sensor; and FIG. 24 is a diagram of a configuration for switching divided areas in units of pixels, being a portion of an AF area sensor.

In this third embodiment aspect, portions that are the same as in the first and second embodiment aspects described earlier are not further described here; mainly the points of difference therebetween are described.

The divided areas are first described, with reference to FIGS. 22A and 22B.

With an external light ranging scheme, because there is a difference between the field of view of the ranging optical system and the field of view of the photographic optical system, when the focal length of the photographic optical system changes, the usable range of the pixel region in the AF area sensor 12 also changes.

In such cases, when the divided area size is fixed, the divided areas will become variously too rough or too fine when the focal length changes, leading to such problems as the detection precision declining or the processing time lag increasing.

That being so, this third embodiment aspect is made so that the divided areas change according to the focal length of the photographic optical system.

Specifically, as indicated in FIG. 22A, if the pixel region corresponding to the image pick-up screen when the focal length is set for wide-angle shooting is designated by the symbol 50 and the divided area(s) by the symbol 51, then the region corresponding to the image pick-up screen when the focal length is set for telephoto shooting will become as indicated by the symbol 52 in FIG. 22B.

At that time, when the divided area 51 is adopted that has the same magnitude as when a wide-angle setting is in effect, the divisions will be too coarse and the detection precision will decline, wherefore, as diagrammed in FIG. 22B, by making the size of the divided area 53 smaller, the number of divided areas when the telephoto setting is in effect can be made close to the number of divided areas when the wide-angle setting is in effect, so that balance is effected.

When, on the other hand, an attempt is made to apply the magnitude of the divided area as used when the telephoto setting is in effect, as diagrammed in FIG. 22B, when the wide-angle setting is in effect, the number of divisions will become too fine, the time required for processing will increase, and the time lag will become great, but, because the divided area 51 with the magnitude as diagrammed in FIG. 22A is used during wide-angle operations also, this can be prevented in the same way.

A concrete configuration for changing divided areas is now described. To keep the description from becoming too complex, the description is given for the case of a basic, simple configuration.

First, the configuration of part of the AF area sensor 12 which is for switching divided areas in units of optoelectric transfer element arrays is described, with reference to FIG. 23.

Divided areas a and b are configured by a plurality of optoelectric transfer element arrays AR, with a monitor unit MB provided in each optoelectric transfer element array AR.

Provision is made so that the output from the monitor unit MB belonging to the divided area a is connected to a divided area a peak detection circuit 55, and a peak monitor output in the divided area a is generated in the divided area a monitor output.

Provision is made, similarly, so that the output from the monitor unit MB belonging to the divided area b is connected to a divided area b peak detection circuit 56, and a peak monitor output in the divided area b is generated in the divided area b monitor output.

When the switches SW1a to SWna are turned on (the switches SW1b to SWnb turned off), it is possible to perform switching so that the optoelectric transfer element arrays AR1 to ARn will belong to the divided area a. Conversely, when the switches SW1b to SWnb are turned on (the switches SW1a to SWna turned off), switching is possible so that those optoelectric transfer element arrays AR1 to ARn belong to the divided area b.

The configuration of part of the AF area sensor 12 that is for switching the divided area pixel by pixel is now described, making reference to FIG. 24.

The divided areas 1 and 2 are configured by a plurality of pixel groups, and monitor circuits 1 to n are provided for each pixel 1 to n.

The outputs of the monitor circuits 1 to n belonging to the divided area 1 are connected to the divided area 1 peak detection circuit 57, and a peak monitor output in the divided area 1 is generated in the divided area 1 monitor output.

Similarly, the outputs of the monitor circuits 1 to n belonging to the divided area 2 are connected to the divided area 2 peak detection circuit 58, and a peak monitor output in the divided area 2 is generated in the divided area 2 monitor output.

In such a configuration as this, when the switches SW1a to SWna are turned on (the switches $\overline{SW1a}$ to $\overline{SWna}$ turned off), the pixel 1 to pixel n can be switched so as to belong to the divided area 1. Conversely, when the switches $\overline{SW1a}$ to $\overline{SWna}$ are turned on (the switches SW1a to SWna turned off), they can be switched so as to belong to the divided area 2.

The switches SW1a to SWna and the switches $\overline{SW1a}$ to $\overline{SWna}$ noted above are configured so that they are controlled by the microcomputer 11 through a pixel monitor output switching circuit 59.

According to this third embodiment aspect, while exhibiting virtually the same effectiveness as the first and second embodiment aspects described earlier, ideal divided areas are set according to the focal length of the photographic optical system, wherefore high detection precision can be maintained without increasing the time lag.

Figure 25:
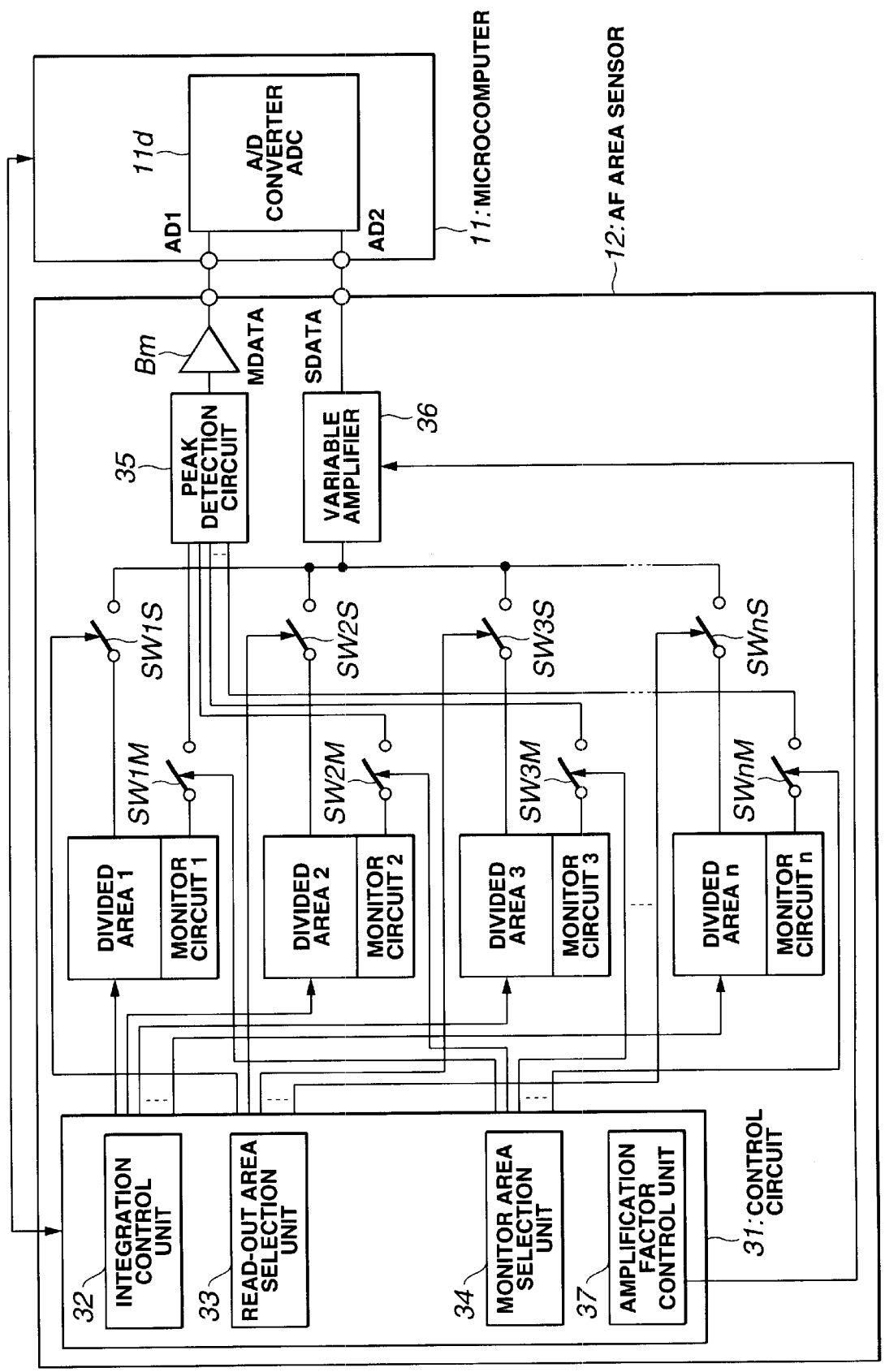
FIG. 25 is a block diagram of the internal configuration of an AF area sensor in a fourth embodiment aspect of the present invention.
Figure 26:
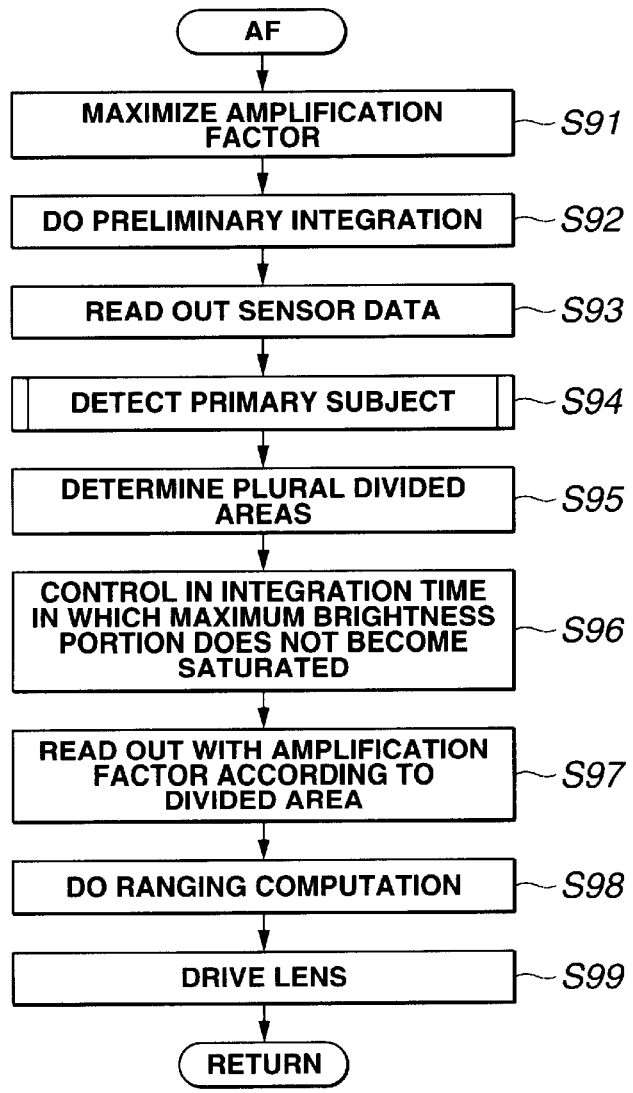
FIG. 26 is a flowchart of AF routines in the fourth embodiment aspect.
Figure 28:
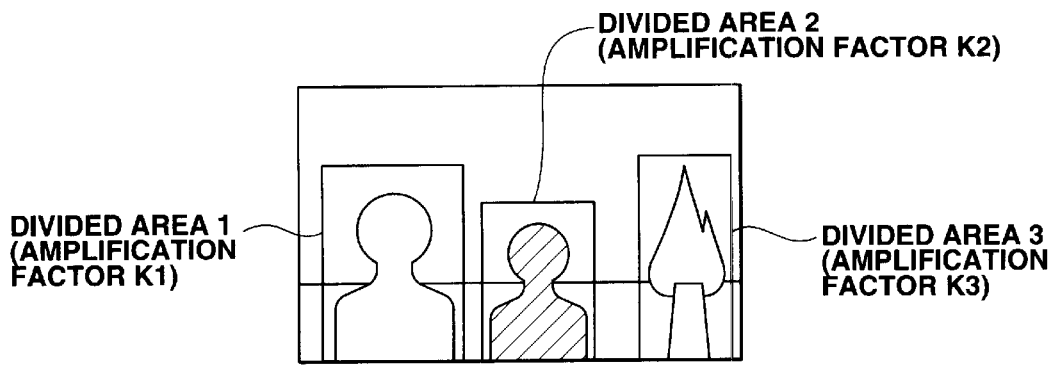
FIG. 28 is a diagram representing divided areas corresponding to candidates for the primary object set for a photographic scene in the fourth embodiment aspect.

FIGS. 25 to 28 represent a fourth embodiment aspect of the present invention. FIG. 25 is a block diagram of the internal configuration of the AF area sensor 12; FIG. 26 is a flowchart of an AF routine; FIGS. 27A, 27B, 27C, 27D, 27E, and 27F are timing charts representing the behavior of signals when preliminary integration and final integration are performed; and FIG. 28 is a diagram representing divided areas corresponding to candidates for the primary object set for a photographic scene.

In this fourth embodiment aspect, portions that are the same as in the first to third embodiment aspects described earlier are not further described; the description focuses on the points of difference therebetween.

First, the internal configuration of the AF area sensor is described with reference to FIG. 25.

This AF area sensor is configured in order to shorten the time lag in the preliminary integration and final integration.

A variable amplifier 36 constituting amplification means is an amplifier which can vary the amplification factor under the control of an amplification factor control unit 37 which is an amplification factor setting means comprised in the control circuit 31. The amplification factor control unit 37 is configured so that it controls the amplification factor by instructions from the microcomputer 11. Thus the variable amplifier 36 is configured so that it amplifies the sensor data and outputs the results to the A/D converter lid in the microcomputer 11.

Next, the AF routine is described with reference to FIG. 26.

In the main routine diagrammed in FIG. 26, when the AF routine is called in step S3, this AF operation is started.

First, the amplification factor of the variable amplifier 36 is set to a maximum amplification factor K (cf. FIG. 27D) (step S91).

Then a preliminary integration operation is performed (step S92). At this time, taking the amplification factor K into consideration, the integration time is set to 1/K times the ordinary control integration time T and integration control is performed (cf. FIGS. 27A and 27B).

The sensor data amplified by a factor of K by the variable amplifier 36 are then A/D converted and read out (step S93) (cf. FIGS. 27C, 27E, and 27F).

Thus, by amplifying, by a factor of K, the sensor data that have been integrated with the integration time modified by the 1/K factor, the preliminary integration time can be shortened without lowering the detection precision.

Next, the primary object is detected (step S94), and a plurality of divided areas is determined (step S95). For a photographic scene such as that diagrammed in FIG. 28, for example, the plurality of divided areas 1 to 3 corresponding to the primary object candidates is set.

Next, final integration is performed (step S96). In this final integration, integration control is effected in an integration time T1 so that the brightest portion(s) in the plurality of divided areas does (do) not become saturated (cf. FIGS. 27A and 27B).

Also, for the divided areas noted above, appropriate amplification factors K1, K2, and K3 are set for each of the divided areas 1, 2, and 3, and the sensor data are read out (step S97) (cf. FIGS. 27C, 27D, 27E, and 27F). In this manner the time lag for the integration time can be suppressed to a minimum.

A ranging computation is then performed (step S98), and the focus lens 14 is driven by the focus lens drive unit 13 based on the results of that ranging (step S99), whereupon the calling routine is returned to.

According to this fourth embodiment aspect, as described in the foregoing, virtually the same effectiveness as in the first to third embodiment aspects described earlier is exhibited. In addition, by setting the sensor data amplification factor to maximum during the preliminary detection operation, and reducing the integration time by a factor that is the reciprocal of the amplification factor, the preliminary integration time can be reduced.

Furthermore, because the amplification factor is varied for each divided area, and respective amplification factors can be set, it is possible to set amplification factors appropriate to each divided area and perform read-out, and obtain appropriate sensor data can be obtained, even when effecting integration control with the same integration time on all areas, for example.

In this invention, it is apparent that working modes different in a wide range can be formed on the basis of this invention without departing from the spirit and scope of the invention. This invention is not restricted by any specific embodiment except insofar as it is limited by the appended claims.

What is claimed is:

1. A distance measuring device comprising:

two optical systems exhibiting parallax;

an image pick-up element for photographically capturing two images formed by said optical systems, respectively;

region division means for dividing a light receiving region of said image pick-up element into a plurality of sub-regions;

region setting means for setting said divided sub-regions based on output from said image pick-up element;

integration control means for controlling integration operations of said image pick-up element for each of said sub-regions divided by said region division means and-set by said region setting means; and distance measurement means for performing distance measurements based on output from said image pick-up element.

2. The distance measuring device according to claim 1, wherein said integration control means perform integration control on said divided regions based on integration quantity monitor signals in divided regions set by said region division means.

3. The distance measuring device according to claim 1, further comprising preliminary detection means for preliminarily performing integration operations to analyze output of said image pick-up element, wherein said region setting means set divided regions based on output from said preliminary detection means.

4. The distance measuring device according to claim 3, further comprising: amplification means for amplifying output of said image pick-up element; and amplification factor setting means for varying amplification factor of said amplification means according to said divided region; wherein said amplification factor setting means set amplification factor of said amplification means to a maximum value when preliminary detection is being performed by said preliminary detection means.

5. The distance measuring device according to claim 1, further comprising focal length detection means for detecting focal length of photographic optical system, wherein said region setting means set divided regions based on output from said focal length detection means.

6. The distance measuring device according to claim 3, further comprising: auxiliary light projection means for projecting auxiliary light on object; and ordinary light elimination means for eliminating ordinary light components other than auxiliary light from output of said image pick-up element; wherein said preliminary detection means activate said auxiliary light projection means and said ordinary light elimination means and perform said preliminary integration operation.

7. A distance measuring device comprising:
   area sensor means deployed at positions of focal points of a pair of image forming optical systems, having a pair of light receiving regions, and capable of performing preliminary integration operations;
   region division means for dividing each of said light receiving regions of said area sensor means into a plurality of sub-regions according to object field luminance distribution obtained by results of preliminary integrations of said area sensor means and a value of focal length of a photographic lens; and
   control means for causing said area sensor means to perform final integration operations for each of said plurality of light receiving regions as set and for performing distance measurement computations based on data obtained for each of said plurality of light receiving regions.

8. The distance measuring device according to claim 7, wherein said region division means divide each of said light receiving regions of said area sensor means into a plurality of regions according to object field luminance distribution obtained by results of preliminary integrations of said area sensor means and to focal length value of photographic lens.

9. A camera having an autofocus device and comprising:
   an area sensor means deployed in the vicinity of position of focal points of a pair of image forming optical systems, and having a pair of light receiving regions;
   a region dividing unit for dividing each of light receiving regions of said area sensor means into a plurality of regions according to area sensor data obtained from results of preliminary integrations of said area sensor means; and
   a control circuit for causing said area sensor to perform final integration operations for each of said plurality of light receiving regions as set, and for computing signals for putting a photographic lens into a focused condition based on data obtained for each of said plurality of light receiving regions.

10. The camera according to claim 9, wherein said control circuit sets monitor regions for monitoring integration control of said area sensor in correspondence with each of said set plurality of light receiving regions.

11. The camera according to claim 9, comprising: an amplification circuit for amplifying output signals of said area sensor; and an amplification factor control circuit for controlling amplification factor of said amplification circuit; wherein said amplification factor control circuit sets amplification factor of said amplification circuit to a maximum value when performing said preliminary integration operation, and to an appropriate amplification factor found for each of said set regions when performing said final integration operation.

12. A distance measuring device comprising:
   an area sensor deployed in the vicinity of focal points of a pair of image forming optical systems, and having a pair of light receiving regions;
   light projection means for projecting light onto photographic object;
   ordinary light elimination means for eliminating ordinary light component from output of said area sensor means;
   main photographic object detection means for detecting region where main photographic object is present by removing areas of the area sensor with a small reflected light quantity in the output of said area sensor means;
   region division means for setting light receiving regions of said area sensor based on output of said main photographic object detection means; and
   control means for causing said area sensor means to perform final integration operations for each of said light receiving regions as set, and performing distance measurement computations based on data obtained for each of said light receiving regions.

13. A control method for a camera that puts a photographic lens into a focused condition for a main photographic object in an image pick-up screen, comprising the steps of:
   detecting image signals in said image pick-up screen;
   detecting said main photographic object based on said image signals;
   setting a virtual area inside said image pick-up screen so as to contain said detected main photographic object;
   again detecting image signals only in said virtual area to define re-detected image signals;
   computing signals for putting said photographic lens into a focused condition based on said re-detected image signals; and
   putting said photographic lens in a focused condition based on results of said computation.

14. The control method according to claim 13, wherein said step for detecting said main photographic object comprises steps of:
   smoothing processing for removing random noise from said image signals;
   differential processing for performing edge detection based on signals which have been subjected to said processing;
   binarizing processing for finding binary image(s) based on signals which have been subjected to said processing;
   labeling figure merging processing for separating connected regions having similar luminance values based on signals which have been subjected to said processing;
   line narrowing processing for objecting said connected regions to a line narrowing process; and
   shape determination processing for extracting main photographic object based on signals which have been subjected to said processing.

15. The method according to claim 14, wherein said shape determination processing step extracts portion wherein a roughly circular portion was detected, as main photographic object.

16. The method according to claim 13, wherein said step for detecting image signals in said image pick-up screen detects amount of light reflected when light was projected in said image pick-up screen.

17. A distance measuring device comprising:
- an area sensor means deployed in the vicinity of focal points of a pair of image forming optical systems and having a pair of light receiving regions;
- region division unit for dividing each of said light receiving regions of said area sensor means into a plurality of sub-regions according to area sensor data obtained by results of preliminary integrations of said area sensor means; and
- control circuit for causing said area sensor means to perform final integration operations for each of said plurality of light receiving regions as set and for performing distance measurement computations based on data obtained for each of said plurality of light receiving regions.

18. A distance measuring device according to claim 17, wherein said control circuit sets monitor regions for monitoring integration control of said area sensor means in correspondence with said of said plurality of light receiving regions as set.

19. A distance measuring device according to claim 17 comprising:
- an amplification circuit for amplifying output signals of said area sensor means; and
- an amplification factor control circuit for controlling amplification factor of said amplification circuit,
- wherein said amplification factor control circuit sets amplification factor of said amplification circuit to a maximum value when performing said preliminary integration operation and to an appropriate amplification factor found for each of said set regions when performing said final integration operation.

* * * * *